(12) United States Patent
Lou et al.

(10) Patent No.: US 10,477,576 B2
(45) Date of Patent: Nov. 12, 2019

(54) METHOD AND APPARATUS FOR MULTI-USER CONCURRENT RANDOM ACCESS FOR WIRELESS LOCAL AREA NETWORKS (WLANS)

(71) Applicant: INTERDIGITAL PATENT HOLDINGS, INC., Wilmington, DE (US)

(72) Inventors: Hanqing Lou, Syosset, NY (US); Guodong Zhang, Syosset, NY (US); Li-Hsiang Sun, San Diego, CA (US); Oghenekome Oteri, San Diego, CA (US); Robert L. Olesen, Huntington, NY (US); Fengjun Xi, San Diego, CA (US); Rui Yang, Greenlawn, NY (US); Xiaofei Wang, Cedar Grove, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/754,847

(22) PCT Filed: Sep. 8, 2016

(86) PCT No.: PCT/US2016/050627
§ 371 (c)(1),
(2) Date: Feb. 23, 2018

(87) PCT Pub. No.: WO2017/044529
PCT Pub. Date: Mar. 16, 2017

(65) Prior Publication Data
US 2018/0242355 A1    Aug. 23, 2018

Related U.S. Application Data

(60) Provisional application No. 62/278,774, filed on Jan. 14, 2016, provisional application No. 62/242,484, (Continued)

(51) Int. Cl.
*H04W 74/08* (2009.01)
*H04W 72/12* (2009.01)
(Continued)

(52) U.S. Cl.
CPC ......... *H04W 74/08* (2013.01); *H04W 72/121* (2013.01); *H04L 27/26* (2013.01); *H04W 84/12* (2013.01)

(58) Field of Classification Search
CPC . H04W 74/0833; H04W 72/042; H04W 4/70; H04W 84/12
See application file for complete search history.

(56) References Cited

U.S. PATENT DOCUMENTS 10,045,349 B2 *  8/2018  Atefi .................. H04W 72/046
10,218,555 B2 *  2/2019  Li ...................... H04L 27/2649
(Continued)

FOREIGN PATENT DOCUMENTS

WO    2015031440 A1    3/2015
WO    2016/176110      11/2016

OTHER PUBLICATIONS

Aboul-Magd, "802.11 HEW SG Proposed PAR," IEEE 802.11-14/0165r0 (Jan. 22, 2014).
(Continued)

*Primary Examiner* — Chandrahas B Patel
(74) *Attorney, Agent, or Firm* — Volpe and Koenig, P.C.

(57) ABSTRACT

A method and apparatus for multi-user concurrent random access for wireless local area networks (WLANs) is described. The method, implemented in a wireless transmit/receive unit (WTRU), includes detecting a trigger frame for uplink (UL) multi-user (MU) transmission. The trigger frame includes an assignment of resource units (RUs) for random access in upcoming UL MU packet data convergence protocol (PDCP) protocol data units (PPDUs) and an
(Continued)

indication that the trigger frame is one of a plurality of trigger frames in a cascading sequence of trigger frames in an MU transmission opportunity (TxOP). The method further includes selecting one of the RUs in the assignment of RUs for a random access transmission and sending the random access transmission on the selected one of the RUs.

18 Claims, 25 Drawing Sheets

Related U.S. Application Data filed on Oct. 16, 2015, provisional application No. 62/217,564, filed on Sep. 11, 2015.

(51) Int. Cl.
  *H04L 27/26* (2006.01)
  *H04W 84/12* (2009.01)

(56) References Cited

U.S. PATENT DOCUMENTS

| | | | |
|---|---|---|---|
| 2013/0286959 | A1 | 10/2013 | Lou et al. |
| 2015/0195854 | A1* | 7/2015 | Zhu ................... H04W 74/08 370/329 |
| 2015/0282211 | A1 | 10/2015 | Zhang et al. |
| 2016/0113034 | A1 | 4/2016 | Seok |
| 2016/0128102 | A1 | 5/2016 | Jauh et al. |
| 2016/0143006 | A1 | 5/2016 | Ghosh et al. |
| 2016/0143026 | A1 | 5/2016 | Seok |
| 2016/0302156 | A1 | 10/2016 | Choi et al. |

OTHER PUBLICATIONS

Aboul-Magd, "802.11 HEW SG Proposed PAR," IEEE 802.11-14/0165r1 (Mar. 17, 2014).
Aboul-Magd, "IEEE 802.11 HEW SG Proposed CSD," IEEE 802.11-14/0169r0 (Jan. 22, 2014).
Aboul-Magd, "IEEE 802.11 HEW SG Proposed CSD," IEEE 802.11-14/0169r1 (Mar. 18, 2014).
Asterjadhi et al., "HE A-Control field," IEEE 802.11-15/1121r0 (Sep. 12, 2015).
Asterjadhi et al., "Scheduled Trigger frames," IEEE 802.11-15/0880r2 (Jul. 4, 2015).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D5.0 (Mar. 2015).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancments for High Efficiency WLAN, IEEE P802.11ax/D0.4 (Aug. 2016).
Fang et al., "UL MU Random Access Analysis," IEEE 802.11-15/0843r1 (Jul. 2015).
Ghosh et al., "Power Save with Random Access," IEEE 802.11-15/1107r0 (Sep. 14, 2015).
Ghosh et al., "Random Access with Trigger Frames using OFDMA," IEEE 802.11-15/0875r1 (Jul. 13, 2015).
Ghosh et al., "UL OFDMA-based Random Access Procedure," IEEE 802.11-15/1105r0 (Sep. 14, 2015).
Harkins, "Secure Password Ciphersuites for Transport Layer Security (TLS)," Transport Layer Security, Internet-Draft, draft-harkins-tls-dragonfly-00 (Aug. 5, 2016).
IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
Merlin et al., "Trigger Frame Format," IEEE 802.11-15/0877r1 (Jul. 13, 2015).
Park, "Specification Framework for TGah," IEEE P802.11 Wireless LANs, IEEE 802.11-11/1137r15 (May 14, 2013).
Stacey et al., "Proposed TGax draft specification," IEEE 802.11-16/0024r1 (Mar. 2, 2016).
Stacey, "Specification Framework for TGax," IEEE P802.11 Wireless LANs, IEEE 802.11-15/0132r7 (Jul. 20, 2015).
Stacey, "Specification Framework for TGax," IEEE P802.11 Wireless LANs, IEEE 802.11-15/0132r15 (Jan. 28, 2016).
Yang et al., "Cascading Structure," 802.11-15/0841r1 (Jul. 2015).

* cited by examiner

METHOD AND APPARATUS FOR MULTI-USER CONCURRENT RANDOM ACCESS FOR WIRELESS LOCAL AREA NETWORKS (WLANS)

CROSS REFERENCE TO RELATED APPLICATIONS

This application is the U.S. National Stage, under 35 U.S.C. § 371, of International Application No. PCT/US2016/050627, filed Sep. 8, 2016, which claims the benefit of U.S. Provisional Application No. 62/217,564, which was filed on Sep. 11, 2015, U.S. Provisional Patent Application No. 62/242,484, which was filed on Oct. 16, 2015, and U.S. Provisional Patent Application No. 62/278,774, which was filed on Jan. 14, 2016, the content of which are hereby incorporated by reference herein.

SUMMARY

A method and apparatus for multi-user concurrent random access for wireless local area networks (WLANs) is described. The method, implemented in a wireless transmit/receive unit (WTRU), includes detecting a trigger frame for uplink (UL) multi-user (MU) transmission. The trigger frame includes an assignment of resource units (RUs) for random access in upcoming UL MU packet data convergence protocol (PDCP) protocol data units (PPDUs) and an indication that the trigger frame is one of a plurality of trigger frames in a cascading sequence of trigger frames in an MU transmission opportunity (TxOP). The method further includes selecting one of the RUs in the assignment of RUs for a random access transmission and sending the random access transmission on the selected one of the RUs.

BRIEF DESCRIPTION OF THE DRAWINGS

A more detailed understanding may be had from the following description, given by way of example in conjunction with the accompanying drawings wherein.

DETAILED DESCRIPTION

Figure 1A:
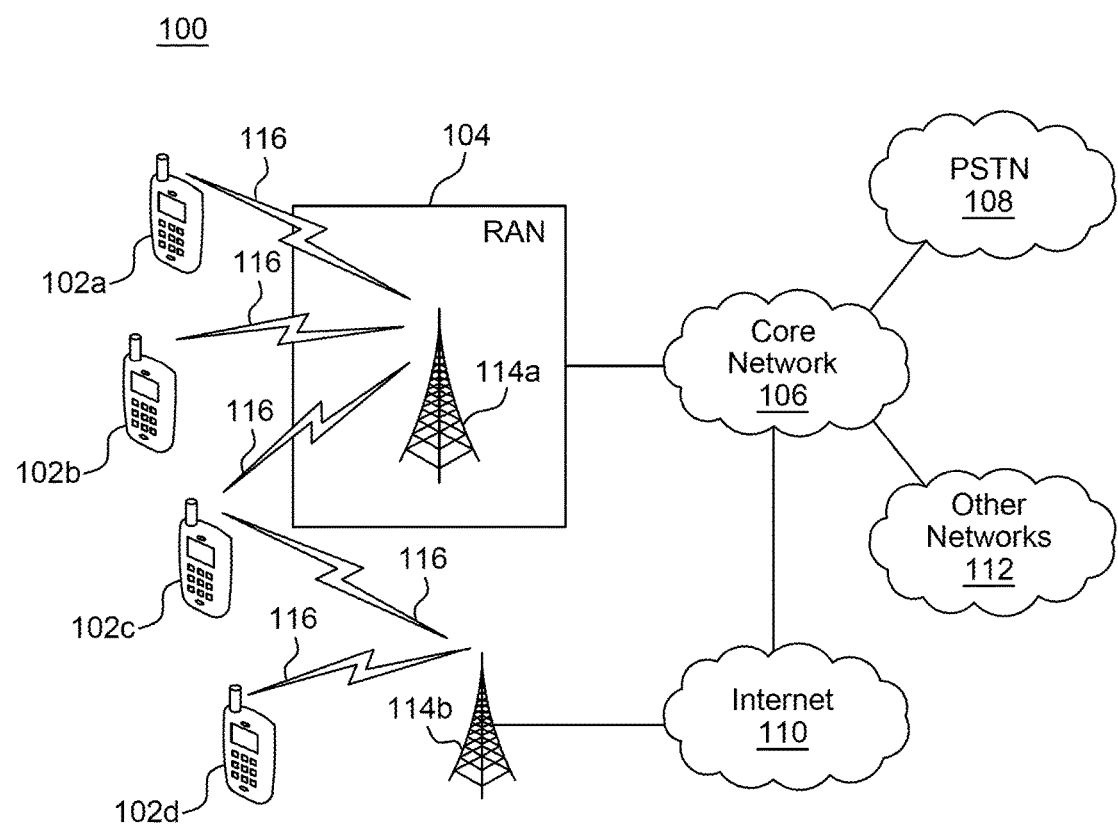
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
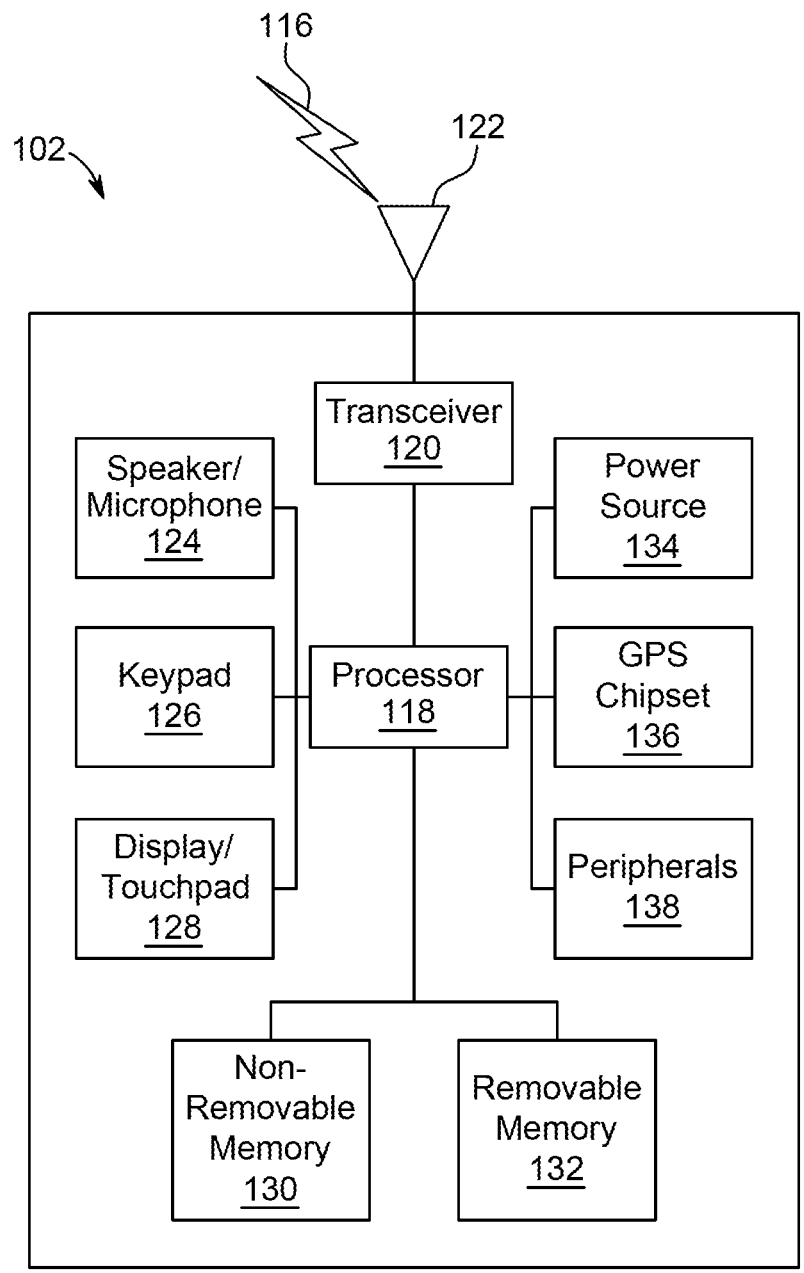
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
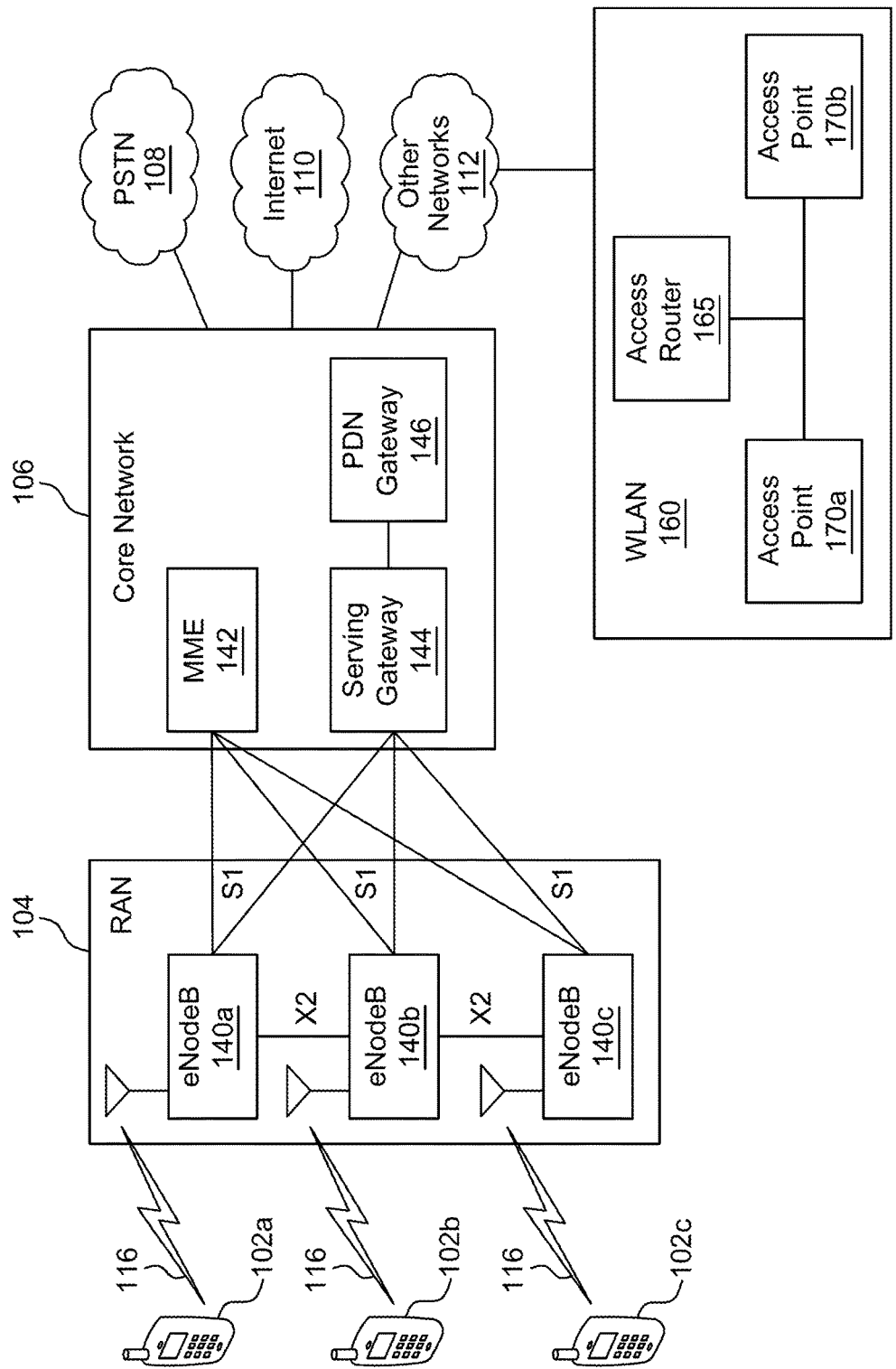
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an Si interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the Si interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

Enhanced distributed channel access (EDCA) is an extension of the basic distributed coordination function (DCF) introduced in Institute of Electrical and Electronics Engineers (IEEE) 802.11 to support prioritized quality of service (QoS). EDCA supports contention based access of the medium. Carrier sense multiple access with collision avoidance (CSMA/CA) is an IEEE 802.11 random access protocol in which a user (e.g., wireless transmit/receive unit (WTRU) or station (STA)) attempting random access measures the channel to determine whether it is clear prior to transmitting a packet. This random access protocol enables STAs to reduce or eliminate collisions on the channel by preventing them before they occur.

The point coordination function (PCF) uses contention free channel access to support time-bounded services with the AP polling each STA in the basic service set (BSS). Using the PCF, the AP may send a polling message after waiting a PCF interframe space (PIFS). If the client has nothing to transmit, the client may return a null data frame. Hybrid coordination function (HCF) control channel access (HCCA) is an enhancement to PCF in which the AP may poll a STA during both a contention period (CP) and a contention-free period (CFP). Using HCCA, an AP may transmit multiple frames under one poll.

Mechanisms for contention-based channel access defined in current IEEE 802.11 specifications, such as EDCA and CSMA/CA, only allow one STA to access the media at one time. The rest of the STAs in a basic service set (BSS) may need to defer channel access and wait for the channel medium to be cleared. In other words, multi-user concurrent random access is not supported in current IEEE 802.11 specifications. Existing single user random access schemes are inefficient and may introduce significant system delay as compared to multi-user (MU) concurrent random access. Embodiments are described herein that provide mechanisms for MU concurrent random access.

In addition to the limitations of current IEEE 802.11 specifications with regard to single user concurrent channel access, current IEEE 802.11 specifications do not provide for high quality of service for users, for example, in high density scenarios. However, enhancements are being considered for high efficiency wireless local area network (HEW) usage scenarios for a broad spectrum of wireless users, including, for example, high-density usage scenarios, such as in the 2.4 GHz and 5 GHz band, as well as radio resource management (RRM) technologies. Potential applications for HEW include emerging usage scenarios, such as data delivery for stadium events, high user density scenarios, such as at train stations or enterprise/retail environments, and usage scenarios which evidence shows are becoming increasingly more depended upon, such video delivery and wireless services for medical applications. In scenarios where there is a dense network with many STAs, the random access procedure may break down due to all the STAs accessing the network simultaneously.

Similarly, evidence has been provided that measured traffic for a variety of applications has a large likelihood for short packets, and there are also network applications that may generate short packets. Such applications may include, for example, virtual office, transmit power control (TPC) acknowledgement (ACK) applications, video streaming ACK applications, device/controller applications (e.g., mice, keyboards, and game controls), network selection applications (e.g., probe requests and access network query protocol (ANQP)), and network management applications (e.g., control frames).

In the uplink (UL) transmission of a flood of small sized or time sensitive packets, the overhead required to identify STAs with such data and to schedule them in a typical OFDM or OFDMA transmission may result in performance degradation due to the overhead of the transmissions. Embodiments described herein may enable efficient transmission of this type of traffic using OFDMA random access channel (RACH) access. In scenarios where there are many STAs, such embodiments may also limit or eliminate OFDMA RACH collisions between the different STAs' transmissions.

More specifically, in embodiments described herein, a base station or access point (AP) may signal a trigger frame for multi-user channel access. As is described in detail below, the trigger frame may trigger a STA to transmit a UL MU physical layer convergence protocol (PLCP) protocol data unit (PPDU) (e.g., MU-multiple-input multiple-output (MIMO) or OFDMA). The UL MU PPDU may be transmitted in a set of defined resource units (RUs) on which multiple WTRUs or STAs may transmit frames of different types. In embodiments, at least some of the RUs may be designated for random access. In some embodiments, a single trigger frame may be signaled per TxOP, or a series of cascading trigger frames may be signaled per TxOP, for example, to address the scenario where many time sensitive or small sized packets are being transmitted in a network or BSS at the same time.

Figure 2A:
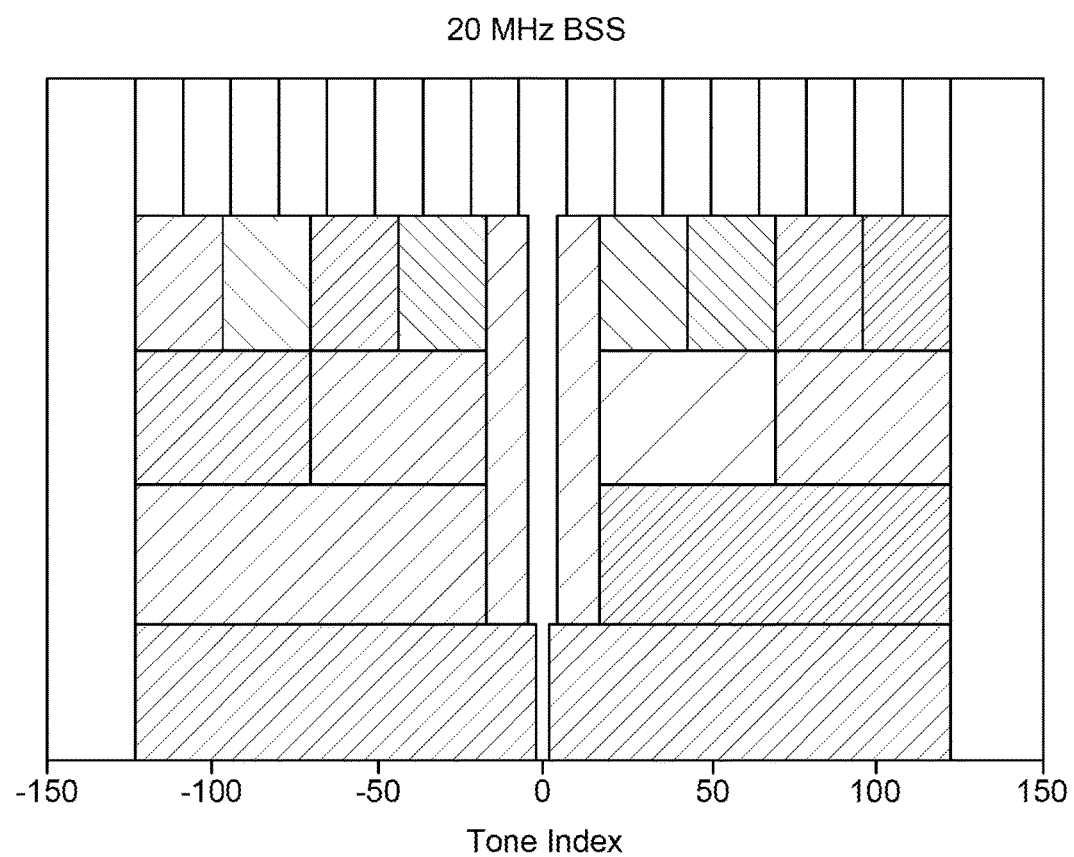
FIG. 2A is a diagram illustrating example building blocks for an example 20 MHz orthogonal frequency-division multiple access (OFDMA) UL MU PPDU for 20 MHz that may be sent in response to a trigger frame.

By way of example, for an OFDMA UL MU PDDU operating on a 20 MHz band, the building blocks for an OFDMA UL MU response transmission may be defined as 26-tone with 2 pilots, 52-tone with 4 pilot, and 106-tone with 4 pilots and with 7 DC Nulls and (6,5) guard tones, and at locations as illustrated in FIG. 2A. An OFDMA PPDU may carry a mix of different tone unit sizes within each 242 tone unit boundary. Similar building blocks are defined for 40 MHz, 80 MHz, 160 MHz and 80+80 MHz.

A trigger frame may be used to synchronize and schedule UL MU transmissions and may serve different purposes, as mentioned above. To this end, there may be different types of trigger frames that may address different functions of the system. Further, a trigger frame may be used to trigger UL MU random access and/or a dedicated transmission. In so doing, it may also facilitate synchronization or time/frequency alignment of UL transmissions.

Figure 2B:
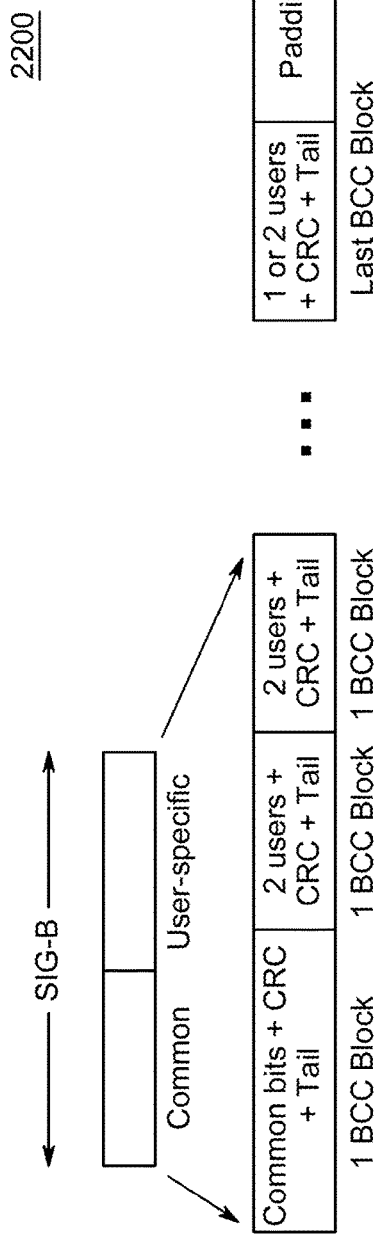
FIG. 2B is a diagram of an example high efficiency signal B (HE-SIG-B) field.

For scheduled access, a trigger frame may specify the STAs and their resource unit (RU) assignment and the transmission parameters per STA in the HE-SIG-B field in the preamble. The HE-SIG-B field may have a common field followed by a user-specific field. The common field may include the information for all of the designated STAs to receive the PPDU in corresponding bandwidth. The user specific field may include multiple sub-fields that do not belong to the common field, and one or multiple ones of the sub-fields may be for each designated receiving STA. An example of a user-specific field may include the Station ID (STAID). For single-user allocations in an RU, examples of user-specific fields may include a number of spatial streams (NSTS) field, a transmit beamforming (TxBF) field, a modulation and coding scheme (MCS) field, a dual sub-carrier modulation (DCM) and coding field (e.g., specifying use of low density parity check (LDCP)). For each user in a multi-user allocation in an RU, examples of user-specific fields may include spatial configuration fields, MCS fields, DCM fields and coding fields. An example HE-SIG-B field 2200 is provided in FIG. 2B.

In embodiments, a trigger frame may be a unicast frame or a broadcast/multicast frame. A unicast trigger frame may have a single dedicated receiver address. Based on the information carried in either the HE-SIG-A and/or HE-SIG-B fields, unintended STAs may not need to monitor the remaining part of the unicast trigger frame. A broadcast/multicast trigger frame may not have a single dedicated receiver address. Instead, it may have a dedicated or random group of receive STAs. The frame may carry scheduling and/or resource allocation information. All STAs in range of the transmission may need to monitor the transmission. Examples of broadcast/multicast trigger frames may include trigger frames for random access and trigger frames that may schedule UL MU transmission for one or more STAs.

In embodiments, a trigger frame may be aggregated with other data frames, control frames, or management frames in a medium access control (MAC) layer or in the format of an aggregated MAC PDU (A-MPDU). In this way, the trigger frame may use the same MCS as other frames. In order to better protect the trigger frame, the trigger frame may be allocated as the first MPDU among the first several MPDUs in an A-MPDU format or the trigger frame may be repeated in an A-MPDU. The repeated trigger frame MPDU may or may not be allocated adjacently in an A-MPDU. In embodiments, the original version and repeated version of the trigger frame may be exactly the same, and the version index may be signaled in the MPDU delimiter, or the version index may be signaled in each MPDU (e.g., using the frame control field).

A trigger frame may be transmitted with other frames any type in a DL MU mode, such as a DL OFDMA mode or a DL MU-MIMO mode. Alternatively, the trigger frame may be transmitted using a conventional single user (SU) OFDM mode.

In embodiments, a trigger frame may be the acknowledgement of the previous UL MU frame, or the trigger frame may be aggregated with an acknowledgement frame. In embodiments, the trigger frame or aggregated trigger frame may carry physical layer acknowledgements. In embodiments, a trigger frame may be allowed to trigger STAs without association identifiers (AIDs).

Figure 3A:
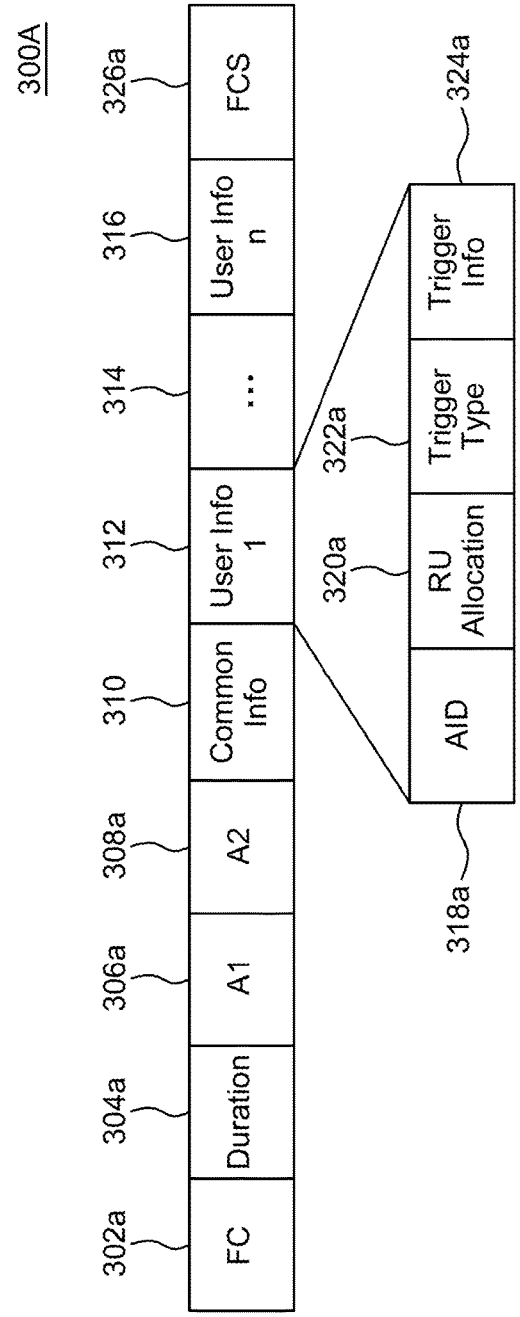
FIGS. 3A and 3B are diagrams of example trigger frames for MU random access.
Figure 3B:
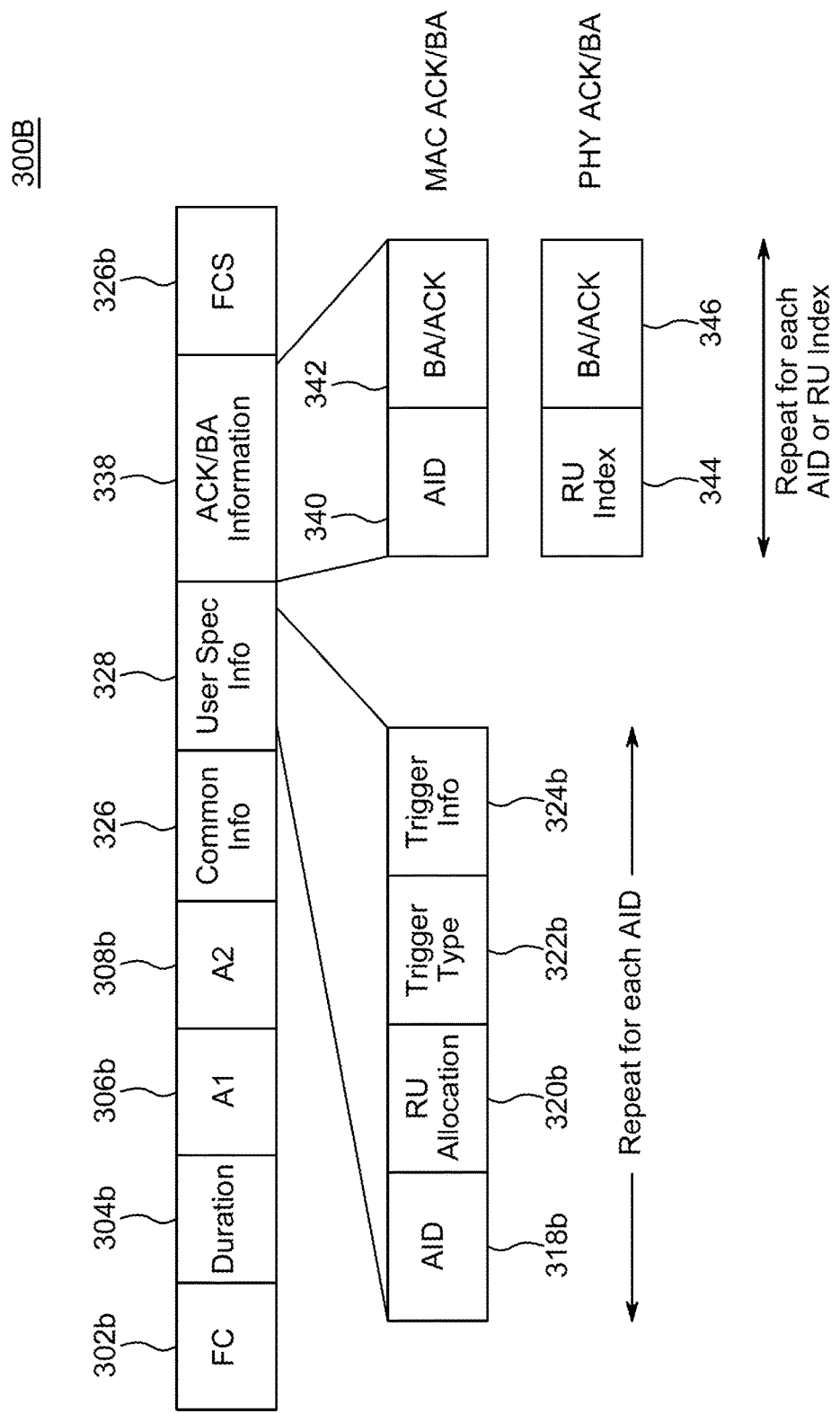

FIGS. 3A and 3B are diagrams of example trigger frames 300A, 300B, respectively, for MU random access. In both illustrated examples, the trigger frame may have a unified format, which includes a frame control field (FC) 302*a*, 302*b*, a duration field 304*a*, 304*b*, an address 1 (A1) field 306*a*, 306*b*, an address 2 (A2) field 308*a*, 308*b*, a common information field 310, 326, one or more user specific information fields 312, 314, 316, 328 and an FCS field 326*a*, 326*b*. As described in more detail below, the trigger frame 300A may include acknowledgement/block acknowledgement (ACK/BA) information in the common information field 310, whereas the trigger frame 300B may include an ACK/BA information field 338 that is separate from the common information field 326. The frame structure for the trigger frame 300B may provide added flexibility in that it may enable the ACK/BA information field 338 to be included or omitted from the frame depending on whether it is needed for that particular trigger frame.

For both example trigger frames, the FC field 302*a*, 302*b* may be used to indicate that the frame 300A, 300B is a trigger frame. The duration field 304*a*, 304*b* may be set to an estimated time duration during which a UL transmission for an allocated STA is allowed to transmit on the RUs specified in the trigger frame. The estimated time duration may be in certain units, such as microseconds (ms). Unintended STAs receiving the trigger frame may set a NAV value for signal protection or multiple protections. The A1 field 306*a*, 306*b* may be set to the broadcast address or group address if the trigger frame is a broadcast or multicast frame or to a dedicated receiver MAC address if the trigger frame is a unicast frame. The A2 field 308*a*, 308*b* may be set to the basic service set ID (BSSID) associated with the AP, such as the MAC address of the AP.

For both of the trigger frames 300A and 300B, the common information field 310, 326 may include different types of information, such as a sequence number and/or trigger token, common transmit power control (TPC) indices, common synchronization information, upcoming SIG information, a value of a time synchronization function (TSF) associated with the trigger frame and/or beacon sequence, last trigger for PS-POLL information, and/or information related to a UL preamble of scheduled UL frames.

The sequence number and/or trigger token may be used to solicit the trigger frame and/or the upcoming UL MU transmission. Together with the RU index, this information may be used to identify a STA without using AID or other types of STA IDs. Alternatively, this information may be included in the user specific information field. In some embodiments, this information may be omitted depending on the trigger type and/or random access type being employed.

The TPC indices may indicate TPC information that may be used by the STAs for open-loop and/or closed loop TPC. For example, the indices may include the transmit power index that was used to transmit the current trigger frame and/or a desired/expected received power index at the AP by which multiple STAs may align the received power.

The common synchronization information may include timing and/or frequency offset correction information. The upcoming SIG information may include information to set the L-SIG and/or HE-SIG-A fields in the upcoming UL MU transmission.

Regarding the value of the TSF associated with the trigger frame and/or beacon sequence, the trigger frame may be used to schedule target wake time (TWT)-enabled STAs, which may not monitor a beacon to adjust their timing synchronization functions (TSFs). The TSF information may enable a STA to correct its clock drift to sync up with a future TWT. A beacon sequence may indicate that system information has changed and that STAs may need to re-read the beacon. STAs may use this information regardless of whether the STA is addressed in a later user specific information field 312, 314, 316, 328.

Regarding the last trigger for PS-Poll information, the trigger frame may be used to schedule TWT-enabled STAs, which may not monitor beacon traffic indication map (TIM) information to know whether they have downlink (DL) data buffered. A STA that has no UL data and receives a trigger frame indicating that it is the last trigger frame that schedules UL PS-Polls of the TWT service period (SP) may go to sleep for the rest of TWT SP. Alternatively, the last trigger for PS-POLL information may be included in user specific information field with the corresponding trigger type and random access type.

Regarding the information related to the UL preamble of the scheduled UL frames, all scheduled STAs may need to construct an HE-SIG-A identical to each other as there may be no OFDMA for the legacy OFDM symbols. This information may include information needed for the protection of the DL frames immediately following the UL scheduled frames, such as BA for the scheduled UL frames, or the next trigger frame in a cascading sequence. For example, the AP may dictate how RID in the UL preamble should be set based on the length of the planned DL frames immediately following the scheduled UL transmission.

The information related to the UL preamble of the scheduled UL frames may also include a traffic requirement, which may provide information about a restriction on the AP added to the random access. The traffic requirement may be one or more traffic IDs (TIDs), one or more EDCA access categories, or one or more traffic categories (TCs). This information may be included in a field that may, in an embodiment, be implemented as a hash or bitmap or combination to indicate, for example, one or more TIDs or ACs.

As mentioned above, the trigger frame 300A includes ACK/BA information in the common information field 310, which may indicate whether the trigger frame includes acknowledgements for the previously transmitted UL frames and may include MAC ACK/BA information and/or PHY ACK/BA information. MAC ACK/BA information may indicate that the one or more acknowledgements carried is the MAC ACK/BA, which may include an AID field that may be set to the AID of the STA of the corresponding data transmission that the ACK/BA acknowledges. The MAC ACK/BA information may also include ACK/BA information, which may be set as a normal ACK or BA field for a previous transmission from the STA with the AID indicated. PHY ACK/BA information may indicate that the one or more acknowledgements carried is the PHY ACK/BA, which may not include STA IDs, such as AID or MAC ID. Instead, it may indicate whether a transmission on a certain RU or RUs is successful. The PHY ACK/BA information may include an RU index, which may be used to identify the RU, and ACK information, which may indicate whether the information carried on the RU is decoded successfully. In embodiments, the PHY ACK/BA field may be a bitmap, and each bit may be an ACK/NACK corresponding to an RU.

For the trigger frame 300B, the common information field 326 includes ACK/BA information, which indicates whether the ACK/BA information field 338 is present in the trigger frame 300B. The frame 300B further includes the ACK/BA information field 338 later in the trigger frame. The ACK/BA information field 326 is shown in detail in FIG. 3B. If the ACK/BA information field 326 is set, it may present either with MAC ACK/BA or PHY ACK/BA sub-fields, as illustrated in FIG. 3B. If MAC ACK/BA is present, the ACK/BA information field 338 may include an AID sub-field 340 and a BA/ACK sub-field 342. The AID sub-field 340 may be set to the AID of the STA with the ACK/BA information. The ACK/BA sub-field 342 may be set as a normal ACK or BA field for a previous transmission from the STA whose AID is indicated in the AID sub-field 340. If PHY ACK/BA is present, the acknowledgement or acknowledgements carried may be the PHY ACK/BA, which may not include STA IDs, such as AID, MAC ID, etc. Instead, it may indicate whether a transmission on certain RUs is successful. For PHY ACK/BA, the ACK/BA information field 338 may include an RU index sub-field 344 and a BA/ACK sub-field 346. The RU index sub-field 344 may be used to identify the RU on which the transmission being acknowledged was sent. The BA/ACK sub-field 346 may be set to indicate whether the information carried on the RU was successfully decoded. Alternatively, the PHY ACK/BA field may be a bitmap, and each bit in the bitmap may be an ACK/NACK corresponding to a particular RU.

Each of the user information fields 312, 314, 316, 238 may include information specific to each respective STA being triggered. More or less user information fields may be included in a trigger frame than shown in FIGS. 3A and 3B depending on how many STAs are being triggered. Each of the user information fields 312, 314, 316, 328 may include several sub-fields, which may include a STA ID or AID sub-field 318a, 318b, an RU allocation sub-field 320a, 320b, a trigger type sub-field 322a, 322b, and a trigger information sub-field 324a, 324b.

The STA ID or AID sub-field 318a, 318b may be set in a number of different ways. On a condition that a single user or STA is triggered, this field may be set to the AID or other type of STA ID of the recipient. On a condition that a single user is being triggered without an AID, such as a STA that has not yet associated with the AP or a STA that has requested a UL TxOP using a short frame that does not carry a STA ID, this sub-field may be set to a function of the RU index and a sequence number and/or trigger token. Here, the sequence number and/or trigger token may be used to identify a particular UL MU transmission in the past, and the RU index may be used to identify the RU used in that UL MU transmission. In this way, the STA that has transmitted in the RU of the UL MU transmission may be identified. For a group of users/STAs, such as where MU-MIMO is used on the assigned RU, the group may be triggered on a particular RU or multiple RUs, and this sub-field may be set to a group ID, multicast AIDs or other type of IDs that may indicate the group. On a condition that random access without restriction is being triggered, this sub-field may be set to a broadcast ID. On a condition that a random access with restriction is being triggered, this sub-field may be set to a group address, multicast AIDs or any other type of ID that may indicate a group.

The RU allocation sub-field 320a, 320b may be used to assign one or more RUs to the user/STA.

The trigger type sub-field 322a, 322b may identify the type of trigger for the particular user identified. For example, the trigger may be dedicated, which may indicate that a dedicated transmission is being triggered for the user. Here, the triggered transmission may be a data, control, or management frame transmission. As another example, the trigger may be random, which may indicate that a random access transmission is being triggered. For another example, the trigger may be inherited, which may indicate that the trigger type is inherited from another and/or previous frame type (e.g., management frame). As another example, the trigger type may be mixed, which may indicate that the trigger frame triggers transmissions that include dedicated transmissions and random access transmissions. For example, a trigger frame may explicitly trigger one or more STAs (for example, by included IDs of STAs and the allocated resources) to transmit on one or more radio bearers (RBs) or channels. In addition, the trigger frame may trigger one or more STAs to transmit using random access on one or more other RBs or channels.

For another example of a trigger type, the trigger type sub-field may indicate a null data packet (NDP) frame (preamble-only), which may indicate to a STA, or a group of STAs, that it may send an NDP frame, which may not contain any MAC body. In embodiments, this trigger type may be used to protect future trigger frames in a cascading sequence. In embodiments, the AP may decide how early in a cascading sequence to signal future trigger-frame-protection, for example, because there is a trade-off between spatial reuse and protection. Similarly, this trigger type may trigger the transmission of a common clear to send (CTS) for protection against legacy overlapping base station subsystem (OBSS) STAs.

Figure 4A:
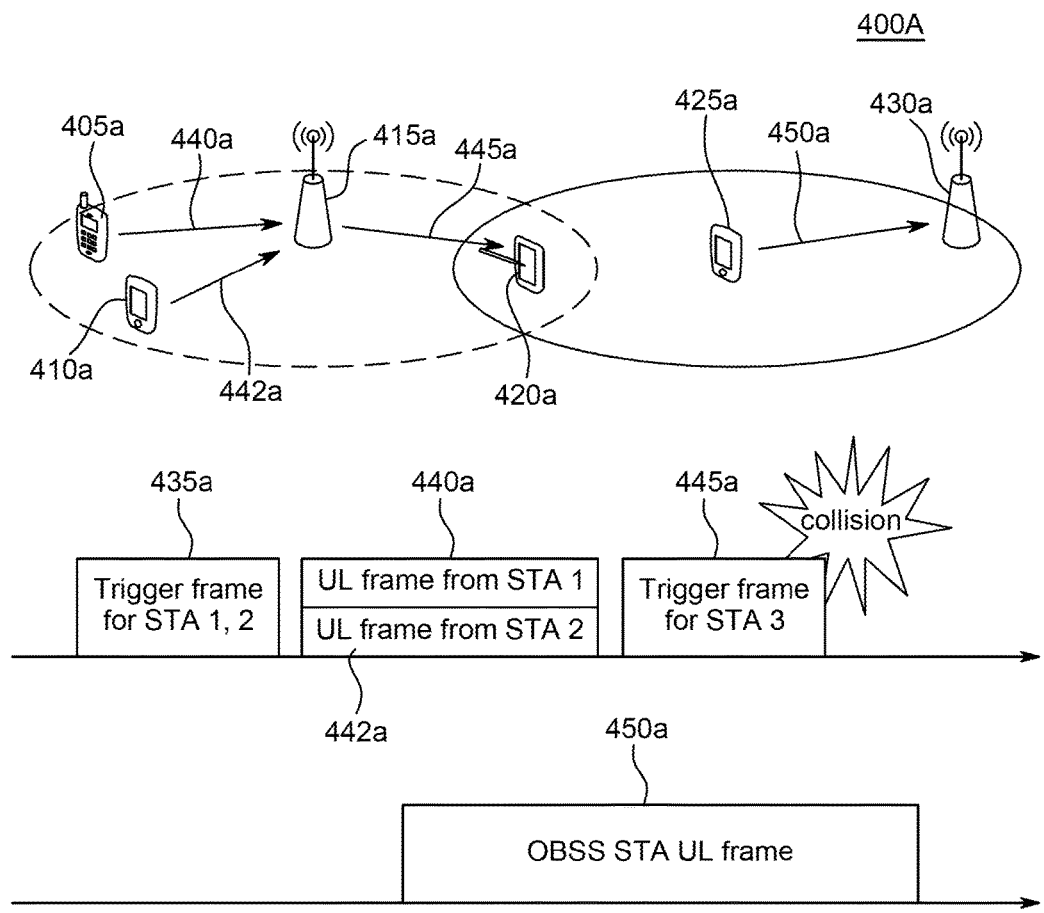
FIG. 4A is a system diagram illustrating a potential scenario that may cause a collision that may be remedied by a null data packet (NDP)-type trigger.
Figure 5:
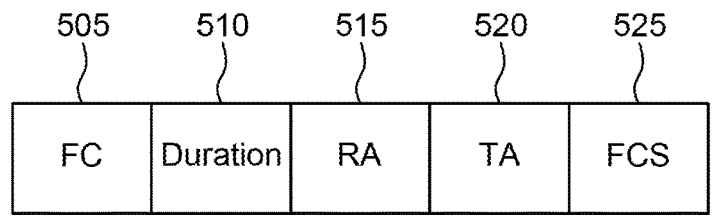
FIG. 5 is a diagram of an example short random access (SRA) medium access control (MAC) frame.

FIG. 4A is a system diagram 400A illustrating a potential scenario that may cause a collision that may be remedied by an NDP-type trigger. In the example illustrated in FIG. 4A, STAs 405a and 410a may transmit UL frames 440a and 442a, respectively, to an AP 415a based on scheduled RUs and a length of transmission indicated in a first trigger frame 435a in a sequence of cascading trigger frames, or in a random access way using allocated RUs in the first trigger frame 435a. An OBSS STA 425a cannot hear the AP 415a or STAs 405a and 410a, and it transmits a frame 450a to an OBSS AP 430a. The AP 415a may not be aware of the transmission 450a of the OBSS STA 425a and may send a trigger frame 445a to another STA 420a. As illustrated in FIG. 5, in this scenario, the trigger frame 445a may collide at the STA 420a with the transmission 450a of the OBSS STA 425a.

Figure 4B:
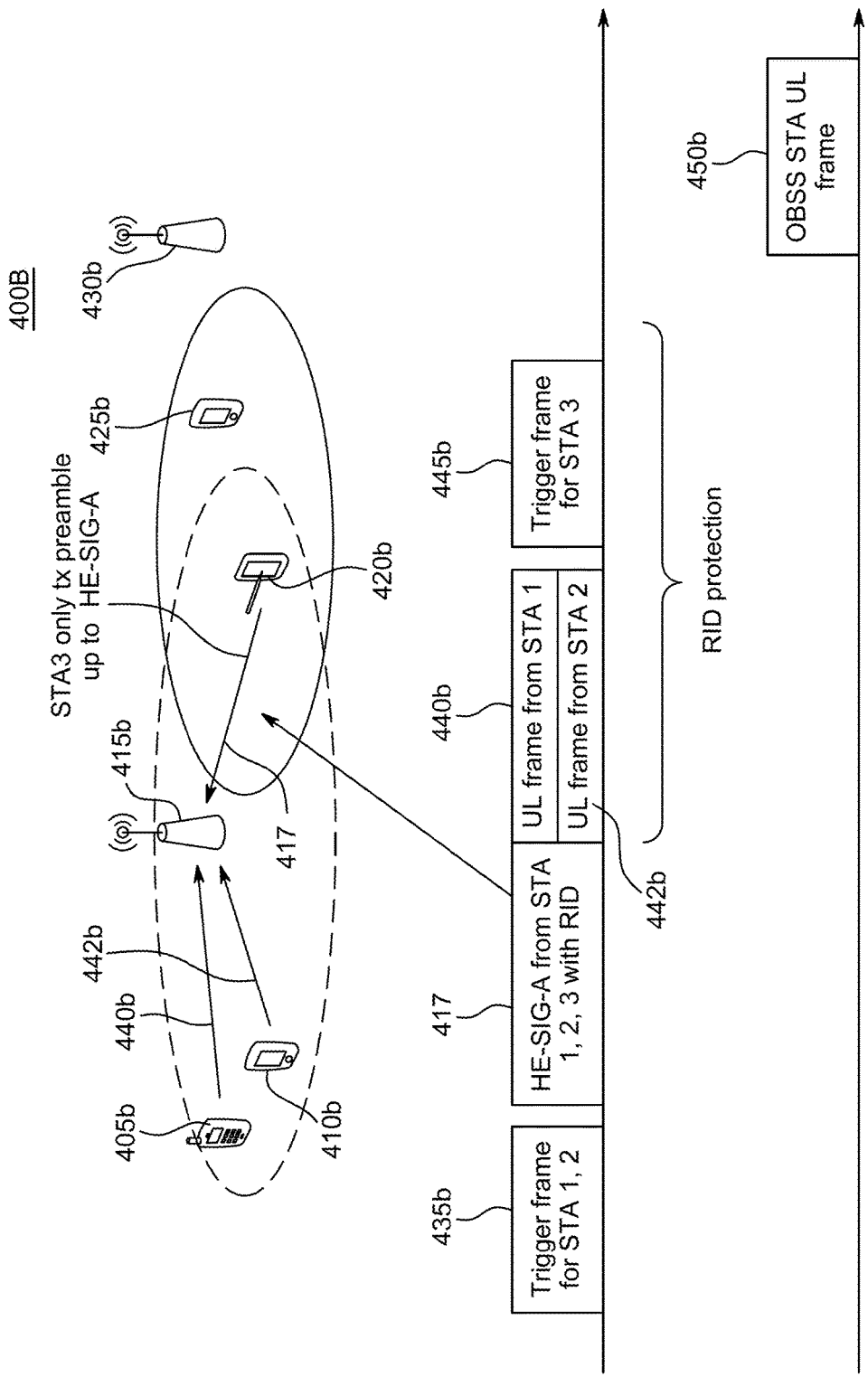
FIG. 4B is a system diagram illustrating how use of the NDP-type trigger may prevent the collision in the scenario of FIG. 4B.

FIG. 4B is a system diagram 400B illustrating how use of the NDP-type trigger may prevent the collision in the potential scenario of FIG. 4A. In the example illustrated in FIG. 4B, the AP 415b may schedule an NDP frame transmission 417 from the STA 420b in the first trigger frame 435b that also schedules the data frame transmissions 440b and 442b from the STAs 405b and 410b. The NDP frame 417 may end at HE-SIG-A and may include a response indication (RID) indicating the length of the expected DL response or responses following the UL transmissions 440b and 442b of the STAs 405b and 410b. On a condition that the OBSS STA 425b hears the NDP frame 417 from the STA 420b, the OBSS STA 425b may use the RID information to defer channel access such that it will not interfere with reception of the DL trigger frame 445b at the STA 425b. In the following UL data frame transmission from the STA 420b, the RID in the preamble may include any necessary information to extend the protection for the STA 420b to receive acknowledgement for its transmission.

Referring back to FIGS. 3A and 3B, the trigger information sub-field 324a, 324b of the user information field 312, 314, 316, 328 may include detailed triggering information and may have variable sizes, for example, depending on the trigger frame type.

On a condition that the trigger type is dedicated trigger, the trigger information sub-field 324a, 324b may include a dedicated access type, an MCS, a number of spatial streams (Nss) or spatial time streams (Nsts), transmit power control information, timing correction information, frequency correction information, maximum packet size in units (e.g., upcoming UL PPDU length in OFDM symbols or upcoming UL MPDU or A-MPDU size in bytes), coding scheme (BCC or LDPC), ACK policy, guard interval size, HE-LTF type, number of HE-LTFs in the upcoming UL transmission, and/or HE-SIG-A type. With regard to the dedicated access type, for example, any of the following dedicated access types may be defined: dedicated access for acknowledgement (D-ACK) and dedicated access for traffic poll (D-TP). The D-TP type of dedicated trigger frame may be used by the AP to poll STAs for traffic information and status. The trigger type may also be STA-specific, and the IDs of the specific STAs triggered to transmit may be explicitly or implicitly included in the trigger frame.

On a condition that the trigger type is random trigger, the trigger information sub-field 324a, 324b may include a random access type and/or a random trigger body. With regard to the random access type, for example, any of the following random access types may be defined: random access for initial link setup (R-Initial), random access for power saving STAs (R-PS), random access for traffic poll (R-TP), or random access for time sensitive small data transmission (R-SD). The R-initial random access type of trigger frame may be used to trigger STAs that may try to associate with the AP. The R-PS random access type of trigger frame may be used for STAs that may wake up from a sleep mode. The R-TP random access type of trigger frame may be used by the AP to poll STAs for traffic information and status. The R-SD random access type of trigger frame may be used by the AP to allocate a time slot for fast UL small data transmissions. The trigger body may be a sub-field that may vary in size depending on the defined random access type for the trigger frame.

The trigger frame illustrated in FIG. 3A may allow an AP to trigger different types of transmissions. For example, an AP may have a 20 MHz channel with 9 RUs. The AP may, for example, allocate RUs 1-3 for initial random access by setting the user information field 312 as: AID=0 (indicating a group address); RU allocation: RUs 1-3; Trigger Type='Random'. In the trigger information sub-field 324, the random access type may be set to R-Initial. In this example, the AP may allocate RUs 4-8 for random access traffic polling by setting the user information field 314 as: AID=0 (indicating a group address); RU allocation: RUs 4-8; Trigger Type='Random.' In the trigger information sub-field 324a, the random access type may be set to R-TP. The AP may allocate RU 9 to STA k for UL data transmission by setting the user information field 316 as: AID=STA k's MD; RU allocation: 9; Trigger Type='Dedicated.'

In embodiments, the frame format illustrated in FIGS. 3A and/or 3B may be used to define a new control frame. However, one or more of the fields, such as the common information field 310, 326 the user specific information field 310, 312, 316, 328, and/or the ACK/BA information field 338, may be aggregated in any frame that may carry the MU control information.

A random access frame may be transmitted in response to the trigger frame that allocated at least one RU for random access. A random access frame may be a MAC frame and may have different formats depending on the trigger type and random access type indicated in the trigger frame. On a condition that the trigger type is set in the trigger frame as 'Random' and the random access type is set to Type='R-Initial'; indicating that random access is for initial setup, the random access frame may be a probe request frame, an association request frame, a reassociation request frame or other type of initial link setup related frame. On a condition that the trigger type is set in the trigger frame as 'Random' and the random access type is set to Type='R-PS,' indicating that random access is for power saving STAs, the random access frame may be a PS-Poll frame or other type of power saving related frame. On a condition that the trigger type is set in the trigger frame as 'Random' and the random access type is set to Type='R-TP,' indicating that random access is for traffic poll, the random access frame may be a UL response frame or other type of frame to indicate the UL traffic status. On a condition that the trigger type is set in the trigger frame as 'Random' and the random access type is set to Type='R-SD,' indicating that random access is for time sensitive small data transmission, the random access frame may be a UL data packet. Certain restrictions may be applied to the data packet transmission. For example, the packet size and/or traffic type may be restricted.

In embodiments, the random access frame may be a short random access (SRA) frame, which may be defined particularly for UL MU random access. The SRA frame may be a MAC frame or a PHY frame. As described above with respect to FIGS. 4A and 4B, there may be scenarios under which the random access protocol for UL MU random access may not completely avoid collisions. The SRA frame may be used to protect long packet transmissions from collision.

FIG. 5 is a diagram of an example SRA MAC frame 500. The SRA MAC frame 500 may be a MAC control frame or a MAC management frame, which may be transmitted in any SU PPDU or MU PPDU. In this way, the AP, as a receiver of the SRA frame 500, may acquire the MAC address of the STAs. Thus, for a cascading trigger frame (which will described in more detail below), the AP may allocate the UL resources using MAC address or corresponding STA ID (e.g., AID or PAID).

The example SRA MAC frame 500 illustrated in FIG. 5 includes an FC field 505, a duration field 510, an RA field 515, a TA field 520 and an FCS field 525. The frame control field 505 may indicate that the frame is an SRA frame using type or subtype sub-fields in the FC field 505. The duration field 510 may be used to set a NAV for unintended STAs that may protect up to the end of a sequence of multiple frames (e.g., multi-station BA as will be described in more detail below). The RA field 515 may include the address of the STA. The TA field 520 may include the MAC address of the AP and may be omitted in some circumstances.

Alternatively, an existing control frame or management frame may be reused or re-interpreted as an SRA frame. For example, an RTS frame transmitted by a non-AP STA in an RU that may be allocated for UL random access may be considered as an RA frame. The AP, as a receiver of the RTS frames, may treat them as SRA frames instead of normal RTS frames.

In embodiments, a trigger frame may allocate all of the RUs for UL MU random access. In this case, an NDP or semi-NDP SRA frame may be used. The NDP or semi-NDP SRA transmission may be considered as a UL MU PPDU without a MAC body. The SIG field in the PLCP header may be over-written as an SRA frame. An NDP SRA frame may take one of a number of different forms, examples of which are provided in FIGS. 6A, 6B and 6C.

Figure 6A:
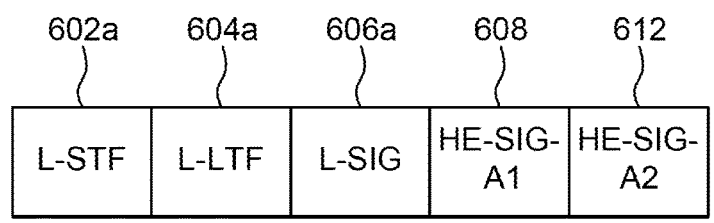
FIG. 6A is a diagram of an example NPD SRA frame.

FIG. 6A is a diagram of an example NPD SRA frame 600A. The example NDP SRA frame 600A illustrated in FIG. 6A includes L-STF and L-LTF fields 602a and 604a, respectively, which may be prepared as for a normal transmission. The NDP SRA frame 600A may also include an L-SIG field 606a, which may be prepared according to the instructions provided in the trigger frame, as described above. A length field in the L-SIG field 606a may indicate the length of the current SRA transmission. With the NDP transmission, the length may be less than the non-NDP frame such that a STA may notice that this is an NDP frame. In embodiments, not all of the non-AP STAs that transmit in the UL MU random access frame may have the same L-SIG field 606a.

The example NDP SRA frame 600A may also include HE-SIG-A1 and HE-SIG-A2 fields, 608 and 612, respectively. The HE-SIG-A1 field 608 may be the first half of the HE-SIG-A field prepared according to the instructions in the trigger frame, as described above. The HE-SIG-A1 field 608 may have the length of an integer number of OFDM symbols. Some fields in the HE-SIG-A1 field 608 may indicate that this frame is an NDP SRA frame. Not all of the non-AP STAs that transmit in the UL MU random access may have the same HE-SIG-A1 field. The HE-SIG-A2 field 612 may be the second half of the HE-SIG-A field and may be prepared according to the instructions in the trigger frame, as described above.

Figure 6B:
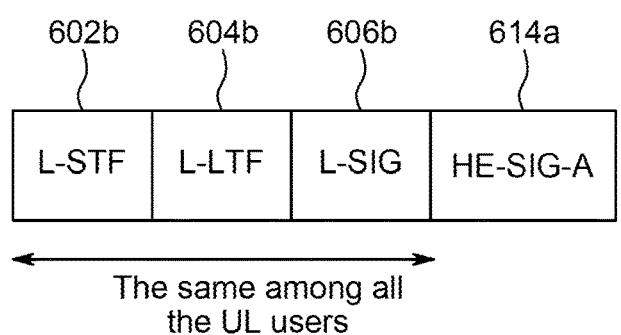
FIG. 6B is a diagram of another example NPD SRA frame.

FIG. 6B is a diagram of another example NPD SRA frame 600B. As for the example NDP SRA frame 600A, the example NDP SRA frame 600B illustrated in FIG. 6B includes L-STF and L-LTF fields 602b and 604b, respectively, which may be prepared as for a normal transmission. As for the example NDP SRA frame 600A, the NDP SRA frame 600B may also include an L-SIG field 606b, which may be prepared according to the instructions provided in the trigger frame, as described above. The length field in the L-SIG field 606b may indicate the length of the current SRA transmission. With the NDP transmission, the length may be less than the non-NDP frame such that a STA may notice that this is an NDP frame. In embodiments, not all of the non-AP STAs that transmit in the UL MU random access frame may have the same L-SIG field 606b.

The UL MU random access frame may be a direct response to the trigger frame. The SRA transmission may be scheduled by the AP, and the SIG fields may be assigned (or dictated) by the AP. On a condition that the AP expects the NDP SRA frame, the STAs may not need to explicitly signal the NDP SRA frame in its UL transmission. For the example NPD SRA frame 600B, instead of having separate HE-SIG-A1 and HE-SIG-A2 fields carrying first and second halves of the HE-SIG-A field, as was the case for the example NPD SRA frame 600A, the STA may overwrite the HE-SIG-A2 field using a user specific sequence to form the HE-SIG-A field 614a. The L-STF/L-LTF and L-SIG fields may, however, be the same among all users.

Figure 6C:
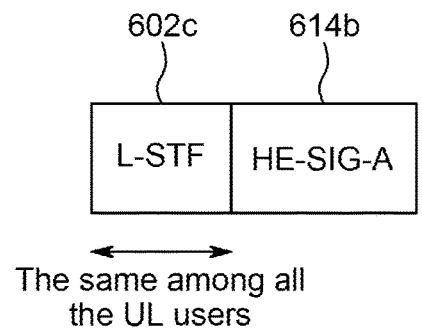
FIG. 6C is a diagram of another example NDP SRA frame.

FIG. 6C is a diagram of another example NDP SRA frame 600C. The NDP SRA frame may be further simplified if backward capability may be addressed by the trigger frame. For example, the trigger frame may be detected by a legacy frame, which may set a NAV for the following multiple frame exchanges. For the example NDP SRA frame 600C illustrated in FIG. 6C, an L-STF field 602c may be needed for automatic gain control (AGC) and timing/frequency detection. However, an LTF field may or may not be included in the NDP SRA frame 600C. The NDP SRA frame 600C illustrated in FIG. 6C includes an HE-SIG-A field 614b following the training field or fields. As for the example NDP SRA frame 600B, the HE-SIG-A field 614b may be over-written and may include a user specific sequence only.

For the example NDP SRA frames 600B and 600C that use user specific sequences, the sequences may be orthogonal to each other such that the AP may distinguish them even when they are transmitted concurrently using the same frequency-time resources. Each sequence may have a sequence ID associated with it. Thus, the AP may use the sequence ID to indicate the STA that successfully transmitted the SRA using that sequence. The user specific sequence may be assigned by the AP in a Beacon frame, an Association response or other type of frame. Alternatively, the STA may randomly select the sequence from a set of sequences, which may be, for example, specified in the standards.

Figure 7:
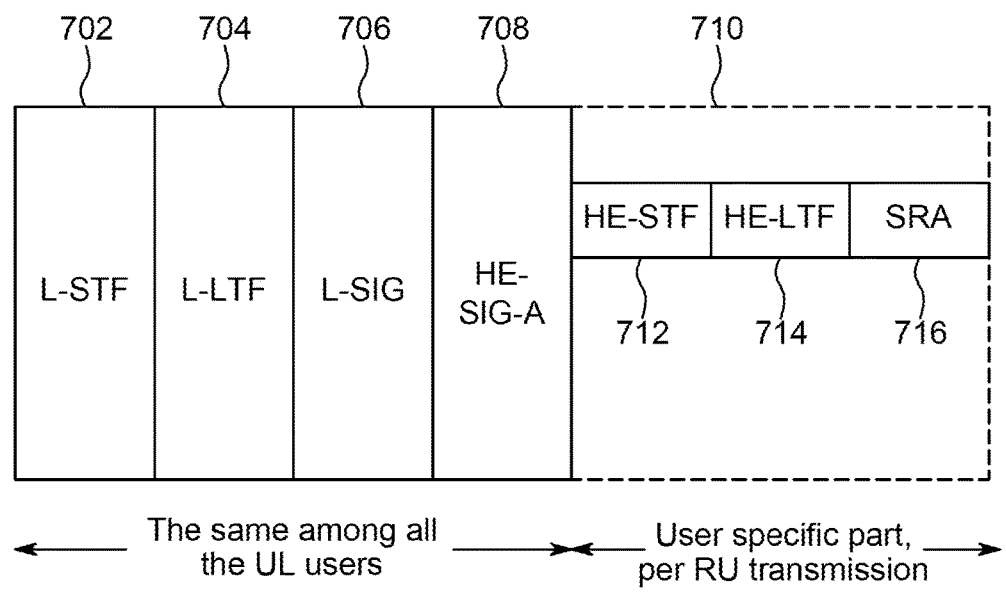
FIG. 7 is a diagram of an example semi-NDP SRA frame.

Instead of using orthogonal sequences, an SRA frame may have an OFDMA-like format, which may be referred to as a semi-NDP SRA frame. FIG. 7 is a diagram of an example semi-NDP SRA frame 700. The example semi-NDP SRA frame 700 illustrated in FIG. 7 includes L-STF, L-LTF, L-SIG and HE-SIG-A fields 702, 704, 706 and 708, respectively, in the PLCP header, which may not be over-written. An SRA field 710 may be transmitted after the preamble on a per RU basis. However, the SRA field 710 may not be a full MAC frame. Instead, the SRA field 710 may carry limited information, such as HE-STF, HE-LTF and SRA information 712, 714, and 716, respectively, which may be short in the time domain (e.g., one OFDMA symbol long).

For example, the minimum RU size may be 26 subcarriers per OFDMA symbol. Here, then, the basic SRA field 710 may carry 26 coded or uncoded bits. In embodiments, the SRA field may be a common sequence or a user specific sequence. In other embodiments, the SRA field may be designed to carry some information, such as a compressed STA ID.

As described briefly above, acknowledgement for a UL random access frame may be included in a trigger frame, which may be used to acknowledge the previous UL transmission and trigger a new UL transmission. In embodiments, such acknowledgement may be made in the ACK/BA information field (or as ACK/BA information in the common information field) in the trigger frame, or the acknowledgement frame may be aggregated with other frames in an A-MPDU format. In embodiments, a multi-STA BA frame may be used. The acknowledgement may be a MAC layer acknowledgement or a PHY layer acknowledgement, as described above. For example, PHY ACK/BA may be more suitable for use than MAC ACK/BA when SRA is used at least because the SRA may not include any information such as MAC address, AID or other type of STA ID. For another example, PHY ACK/BA may be more suitable than MAC ACK/BA when a trigger frame is used to trigger initial link setup when the AID may not be set to the STA.

STAs and APs may indicate their capabilities to support UL MU random access. For example, the AP may include an indicator that the AP is capable of UL MU random access in its Beacon, Probe, Response, Association Response frames or other type of frame or in the MAC header or PLCP header. Similarly, STAs may indicate capability to support UL MU random access in their Probe Request, Association Request or other management, control or other type of frame or in the MAC header or PLCP header.

In embodiments, a 'UL MU random access support' subfield may be included in the Capability information field or in a new HE Capability information element (IE). Alternatively, several separate random access capability indicators may be defined for different uses, such as Capability of supporting random access for initial access, Capability of supporting random access in power saving mode, Capability of support random access for traffic poll and Capability of supporting random access for time sensitive small packets.

Figure 8A:
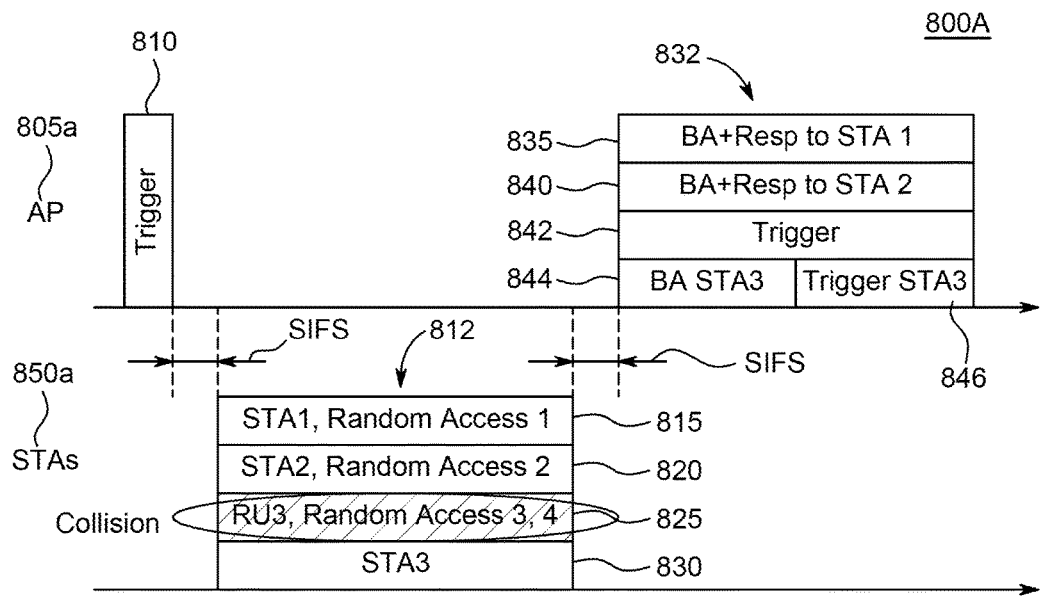
FIGS. 8A and 8B are signal diagrams of example frame exchanges with random access and trigger frames.
Figure 8B:
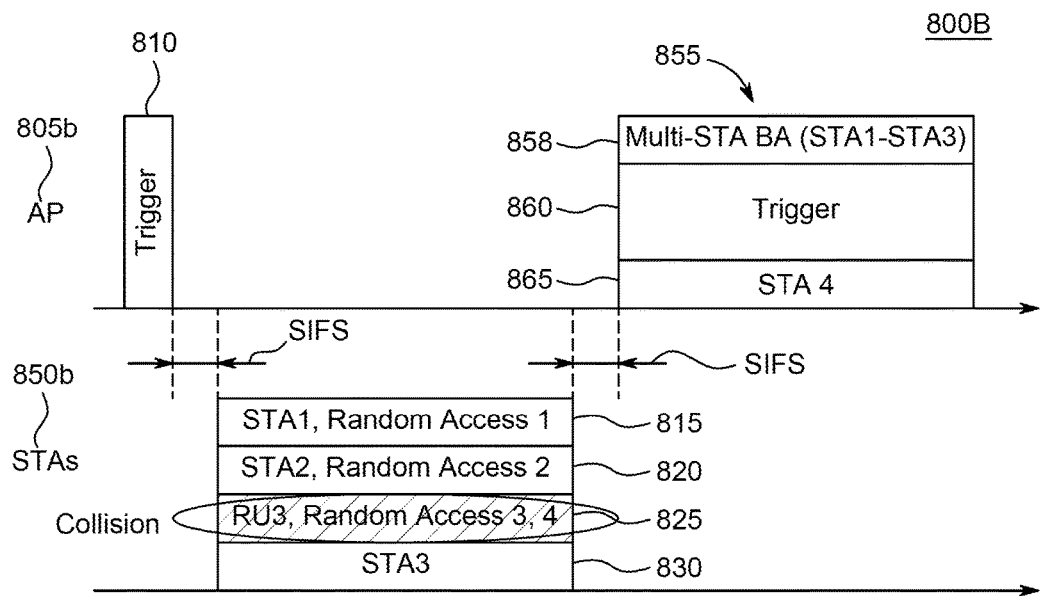

FIGS. 8A and 8B are signal diagrams of example frame exchanges with random access and trigger frames. In FIGS. 8A and 8B, four RUs are provided as an example. However, more or less RUs may be used, as would be recognized by one of ordinary skill in the art.

FIG. 8A is a signal diagram 800A of an example frame exchange between an AP 805a and STAs 850a where an AP 805a may transmit a trigger frame 810, and the trigger frame 810 allocates RUs 1-3 for random access and RU 4 as dedicated for STA3 of the STAs 850a. A short interface space (SIFS) time after the trigger frame 810, STAs 850a may transmit UL MU frames in a UL MU transmission 812. Two of the STAs 850a, STA1 and STA2, may transmit random access frame 815 and 820 on RU1 and RU2, respectively. The AP 805a may detect these transmissions without collision. In the example illustrated in FIG. 8A, two or more of the STAs 850a transmitted their random access frame 825 on RU3, but the transmissions collided. STA3 may transmit a dedicated frame 830 on the allocated RU, RU4.

In the next DL transmission frame (a SIFS time after the UL MU transmission 812), the AP 805a may transmit A-MPDUs 832, which aggregate a block ACK (BA) response 835 and 840 to random access frame 815 and 820 on RU1 and RU2, respectively. A new trigger frame 842 may be transmitted on RU3 where the collision previously occurred. On RU4, the AP 805a may transmit a BA frame 844 to STA3, which may be aggregated with a unicast trigger frame 846 to STA3 to trigger another UL transmission from STA3.

FIG. 8B is a signal diagram 800B of another example frame exchange between an AP 805b and STAs 850b. A difference between the examples illustrated in FIGS. 8A and 8B is that, in the example illustrated in FIG. 8B, in the second DL transmission 855, instead of a unicast BA, a multi-STA BA frame 858 may be used. As shown in the example of FIG. 8B, the AP 805b may transmit the multi-STA BA 858 as an acknowledgement to STA1, STA2 and STA3 for the received and successfully decoded transmissions 815, 820 and 830. The AP 805b may also transmit a trigger frame 860 on RU2 and RU3 and a data frame 865 to a new STA, e.g. STA4, on RU4.

Figure 9:
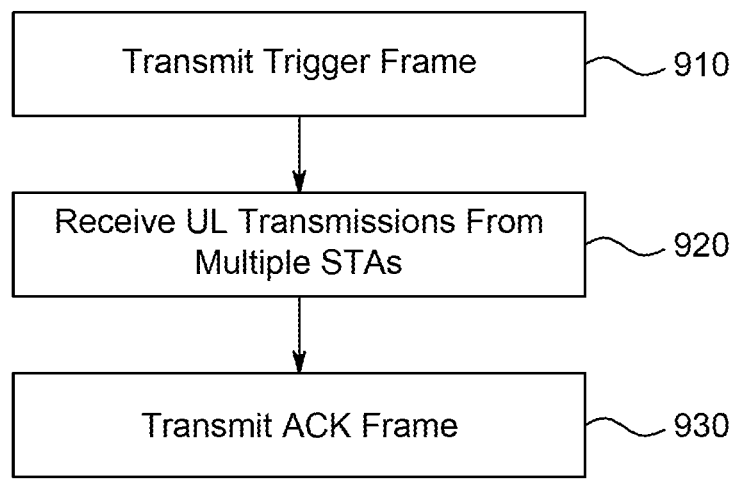
FIG. 9 is a flow diagram of an example method of triggering UL MU random access.

FIG. 9 is a flow diagram 900 of an example method of triggering UL MU random access. In embodiments, an AP may acquire the channel medium either through contention or scheduling. In the example illustrated in FIG. 9, once the AP acquires the channel, it transmits a trigger frame (910), which may include allocation of at least one OFDMA building block or RU for random access in the upcoming UL OFDMA transmission. The AP may transmit the trigger frame in one of many different ways. For example, the AP may transmit the trigger frame as a standalone frame (e.g., the trigger frame 810 illustrated in FIGS. 8A and 8B). As another example, the trigger frame may be a MAC frame and may be aggregated with other frames (e.g., including one or more data frames, control frames and management frames) using an A-MPDU format. In this example, the transmission of the trigger frame may be in an OFDM mode, an OFDMA mode or other mode. An example of this type of trigger frame is the trigger frame 846 illustrated in FIG. 8). For another example, the AP may transmit the trigger frame and other frames (such as data, control and/or management frames) in an MU mode (DL OFDMA or other MU mode). Examples of this type of trigger frame are the trigger frames 842 and 860 in FIGS. 8A and 8B.

If the trigger frame is transmitted in DL OFDMA mode, the resource allocation field in SIG-B of the DL MU PPDU that carries the trigger frame may use a broadcast/multicast (e.g., group ID, extended group ID, multicast AID) or unicast ID (e.g., PAID) to indicate that certain RUs may be assigned for trigger frame transmission. When a broadcast or multicast ID is used, the corresponding one or more potential recipients and/or STAs may need to detect the trigger frame, and unintended STAs may skip the detecting of the trigger frame.

Referring back to FIG. 9, after a SIFS time, the AP may receive UL transmissions from multiple STAs (920). On each RU assigned for random access, for example, the AP may successfully receive a single random access packet from a STA, may receive multiple random access packets from more than one STA (which cause a collision on the RU), or may receive nothing on the particular OFDMA building block.

A SIFS time after receiving the UL MU random access transmission, the AP may transmit one or more acknowledgement frames (930) to the STAs. The acknowledgement frames may include, for example, multi-STA BA frames, ACK frames and/or BA frames. In embodiments, the AP may cascade the acknowledgements with other DL data, control and/or MAC frames. The AP may also aggregate the ACK with a trigger frame, which may be used, for example, to trigger a new set of UL transmissions.

Figure 10:
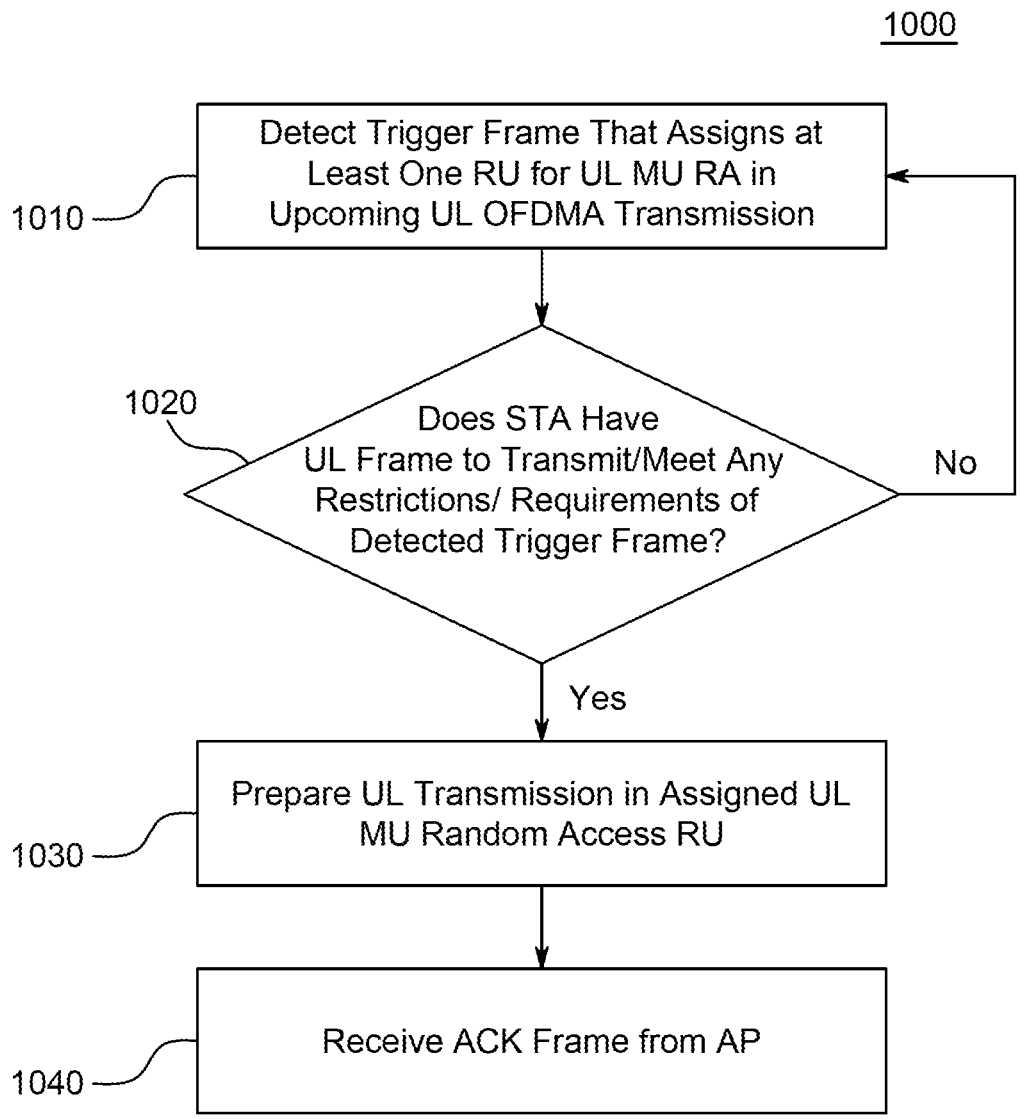
FIG. 10 is a flow diagram of an example method of UL MU random access

FIG. 10 is a flow diagram 1000 of an example method of UL MU random access. In the example illustrated in FIG. 10, a STA may detect a trigger frame that assigns at least one OFDMA building block or RU for UL MU random access in the upcoming UL OFDMA transmission (1010). On a condition that the DL transmission from the AP is in an OFDMA mode, the STA may check the SIG-B field for a resource allocation for the trigger frame. On a condition that the STA has a UL frame to transmit (e.g., a data, management or control frame) and the STA meets any restrictions or requirements specified in the received trigger frame (1020), the WTRU may prepare its UL transmission in the assigned UL random access RU (1030). This may include, for example, applying any necessary padding, power adjustment and synchronization adjustment to the UL transmission such that the transmission from multiple STAs will be aligned at the AP.

Figure 11:
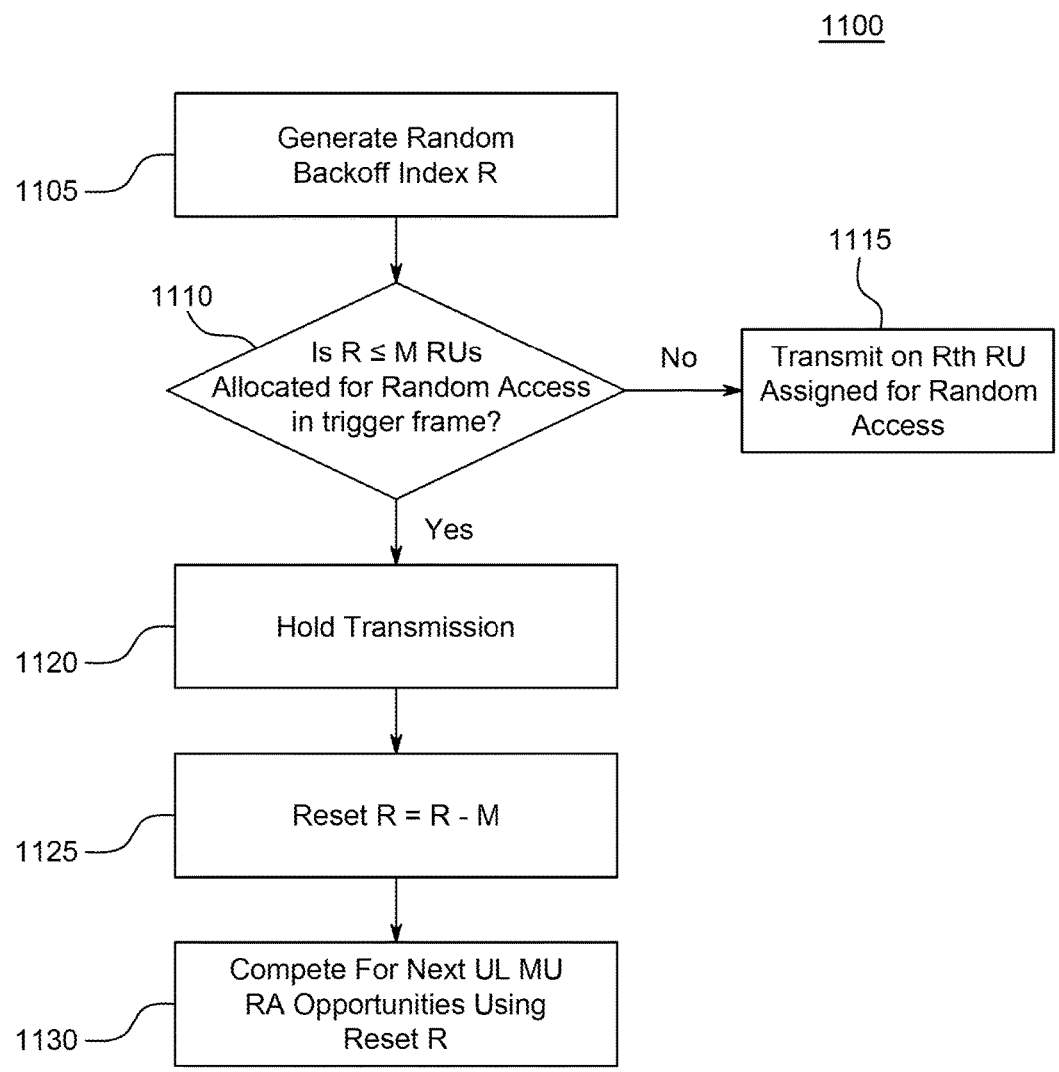
FIG. 11 is a flow diagram of another example method of UL MU random access.

FIG. 11 is a flow diagram 1100 of another example method of UL MU random access. In the example illustrated in FIG. 11, the STA generates a separate random backoff index R for a deferral index on random access RU selection before transmitting (1105). In embodiments, the random number R may be drawn from a uniform distribution over the interval [C, CI], where CI is the contention index, which may be in the range of [CImin, CImax]. CI may initially be set to CImin.

The WTRU may then compare R with M (M is the number of RUs that were allocated for random access in the detected trigger frame). On a condition that R≤M (1110), the WTRU may transmit on the Rth RU assigned for random access (1115). On a condition that R>M (1110), the WTRU may hold its transmission (1120), reset R=R−M (1125), and compete for the next UL MU random access opportunities using the reset offset value R (1130).

Referring back to FIG. 10, a SIFS time after the WTRU transmits its random access frame, if the transmitted frame is successfully received at the AP, the WTRU may receive an ACK frame from the AP (1040). Alternatively, a new trigger frame for future dedicated or random access UL MU transmission received in the DL may serve as acknowledgement for a UL random access transmission. On a condition that the acknowledgement is received from the AP, indicating that the random access frame is successfully decoded at the AP side, then the WTRU may set CI=CImin. Otherwise, the STA may set CI=min(CImin*2,CImax).

Figure 12:
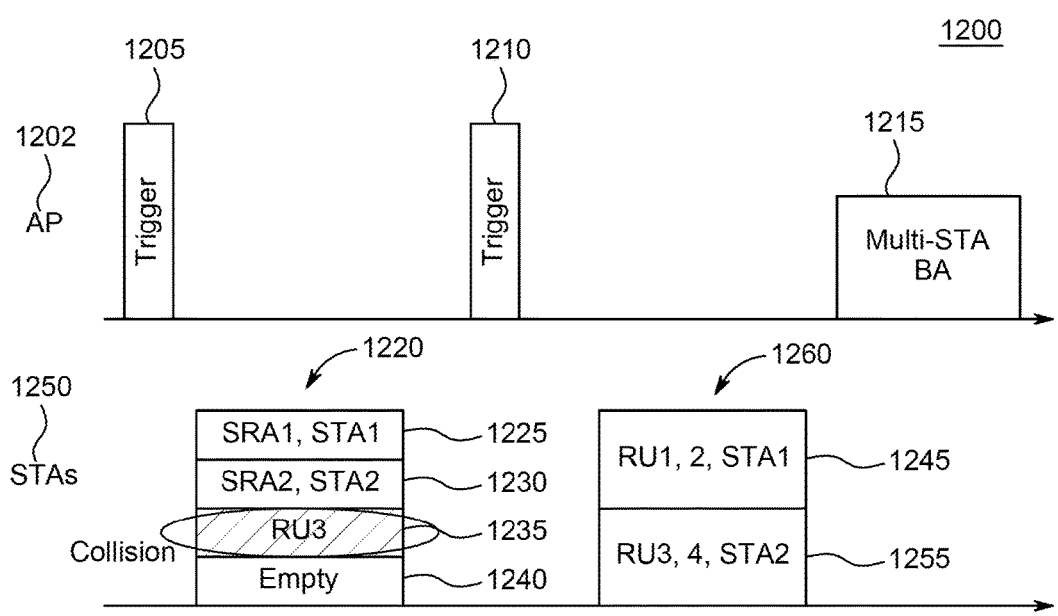
FIG. 12 is a diagram of a random access procedure with SRA frames.
Figure 13:
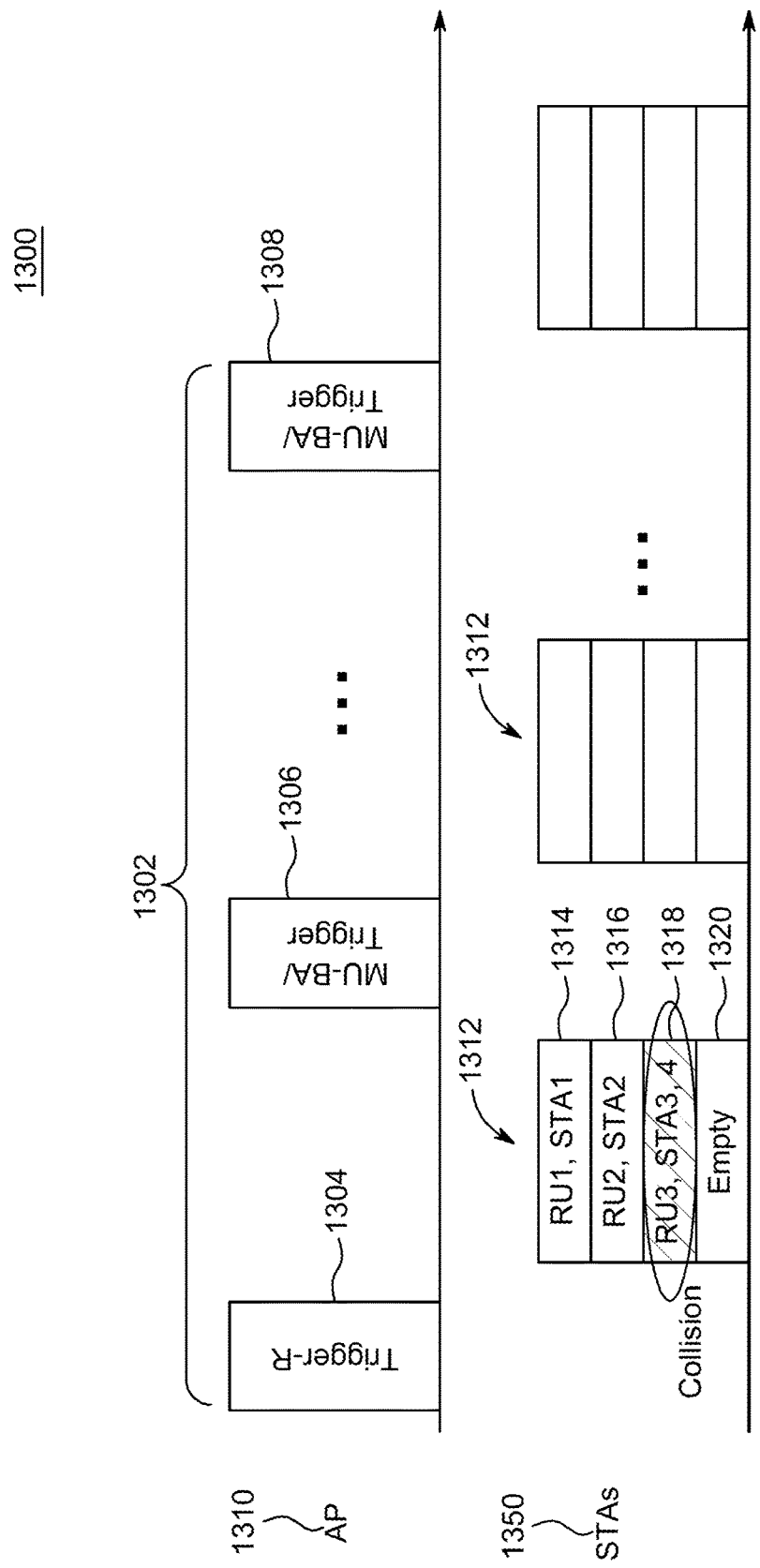
FIG. 13 is a signal diagram of an example sequential random access procedure using cascading trigger frames where random access opportunities (RaOPs) occur after inter-spaced block acknowledgement (ACK)/trigger frames.
Figure 14:
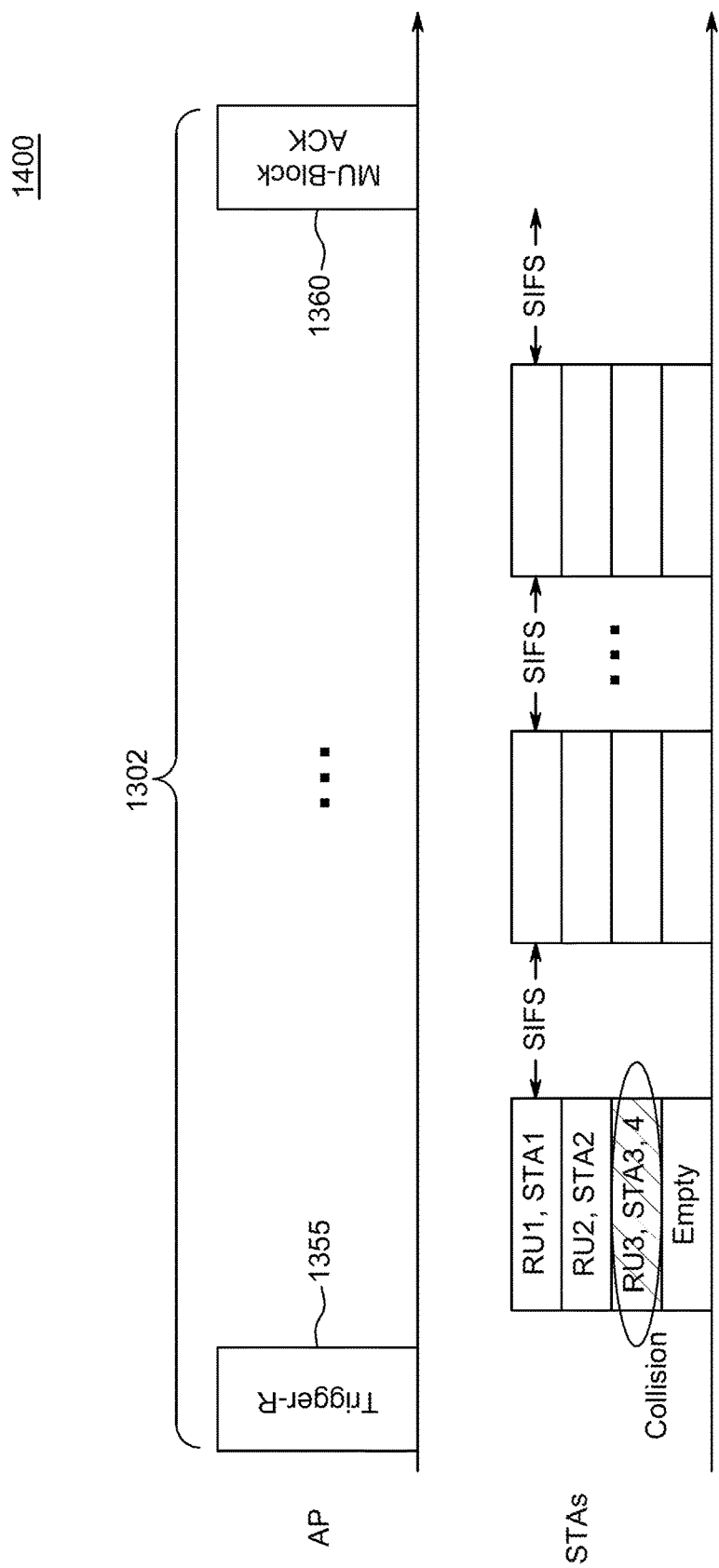
FIG. 14 is a signal diagram of an example sequential random access procedure using cascading trigger frames where RaOPs occur immediately after each other with a delayed MU-Block ACK.

In embodiments, such as for dense STA deployment and/or where a large number of small sized or time sensitive packets are being transmitted in a BSS at the same time, an AP may transmit a number of trigger frames per TxOP. FIGS. 12, 13 and 14 provide examples where multiple trigger frames are transmitted in a TxOP.

FIG. 12 is a diagram 1200 of a random access procedure with SRA frames. In the example illustrated in FIG. 12, an AP 1202 transmits a trigger frame 1205, which may allocate at least one RU for random access. A SIFS time after the trigger frame 1205, the STAs may transmit UL MU frames in a UL MU transmission 1220. In the UL MIMO transmission 1220, STAs 1 and 2 of the STAs 1250 transmit SRA frames 1225 and 1230 on RU1 and RU2, respectively. The SRA frames may be, for example, any of the SRA frames illustrated in FIGS. 6A, 6B and 6C and may include very limited MAC information, if any. A collision may occur between frames 1235 transmitted on RU 1235, and no frame 1240 may be transmitted on RU4, which may, accordingly, be empty.

The AP may send another trigger 1210 during the TxOP, scheduling dedicated UL transmissions for the users that successfully transmitted the SRA frames (STA1 and STA2 in this example) in the UL MU transmission 1220. In the example illustrated in FIG. 12, STA1 is assigned RUs 1 and 2 for its dedicated transmission and STA2 is assigned RUs 3 and 4 for its dedicated transmission. The trigger frame 1210 may also include one or more of PHY/MAC ACK/NACK frames. A SIFS time after the trigger frame 1210, another UL MU transmission 1260 may occur, with the STAs 1 and 2 transmitting dedicated frames 1245 and 1255, respectively. In embodiments, the duration frame in the frame exchanges illustrated in FIG. 12 may be set to protect a sequence of multiple frames.

From the STA end, in response to receiving the trigger frame 1205, it may check whether it may transmit. On a condition that the STA determines that it may transmit a UL MU random access frame, the STA may prepare L-STF, L-LTF fields as in a normal transmission and prepare the L-SIG field following the instruction in the trigger frame 1205. The STA may prepare the HE-SIG-A1 field, which may be the first half of the HE-SIG-A field as described above with respect to FIGS. 6A, 6B and 6C, following the instruction in the trigger frame 1205. In embodiments, the STA may overwrite the HE-SIG-A2 field, which may be the second half of the HE-SIG-A field, using a user specific sequence.

For scenarios where there may be small packets, such as traffic indication packets informing the AP that specific STAs have packets to send, or time sensitive packets, such as packets carrying VoIP or gaming control traffic, the AP may set a random access window with N different random access opportunities, which may be referred to as a continuous random access transmission opportunity (CRA TxOP).

In embodiments, an initial random access trigger frame in a series of cascading trigger frames in a random access transmission opportunity may indicate the traffic type, size and related information as well as the number of trigger frames in the CRA TxOP with a combined multi-STA block ACK/trigger frame inter-spaced between each random access opportunity (RaOP) transmission. In other embodiments, each new RaOP may be transmitted a SIFS time after the previous one ends. Here, a delayed MU-block ACK may be transmitted from the AP at the end of the TxOP. Inter-spaced trigger frames may add and/or remove random access RUs within the CRA TxOP by scheduling specific users on specific RUs on an as-needed basis. Different embodiments for cascading trigger frames are described in more detail below with respect to FIGS. 13 and 14.

To determine the number of random access RUs needed, the AP may observe the number of empty random access RUs within a transmission. This may be a function of no STAs accessing the channel and the number of collisions that occur within a resource. A feedback subframe that informs the AP of the number of random access collisions that the STA has had as well as the primary channels these collisions have occurred on may also be used to help dimension the allocation. In this case, the feedback may include both the RAB index and the RU index within the RaOP.

In embodiments, the STAs may be classified into different groups and random access may be limited to a specific group. This may be combined with cascaded OFDMA transmission to ensure that all the groups are given an opportunity to access the channel. In other embodiments, the STAs may be grouped and specific groups may access a specific set of OFDMA resources.

By way of example, in scenarios where there are many collisions, the AP may specify which groups of STAs are permitted to access a specific RaOP. For example, a first STA group (STA group 1) may be allowed to access RaOP 1, a second STA group (STA group 2) may be allowed to access RaOP 2, and so on. In this case, signaling may be needed to group the STAs and identify the random access opportunity each group may use. A STA may belong to multiple groups. RaOPs may be coordinated between overlapping BSSs to limit the effect of OBSS collisions between the BSSs.

FIG. 13 is a signal diagram 1300 of an example sequential random access procedure using cascading trigger frames where RaOPs occur after inter-spaced block ACK/trigger frames. In the example illustrated in FIG. 13, an AP 1310 sends a trigger frame 1304, which may be a Trigger-R frame that may carry one or more of the duration of the CRA TxOP, the triggered traffic size, the triggered traffic type, the number of RaOP (N) in the CRA TxOP and an indication that the RaOPs occur after an inter-spaced block ACK/trigger frame, such as MU-BA-Trigger frame 1306.

In embodiments, the trigger frames, such as Trigger-R frame 1304 and/or the MU-BA/trigger frames 1306, may indicate which STAs are permitted to transmit in the RaOP and/or the CRA TxOP. In one example, all STAs may be permitted to access any random access resources within the CRA TxOP. In another example, the trigger frame may indicate a sequence of STA groups permitted within each RaOP. Here, the AP may divide the space into multiple random access groups, where each random access group includes STAs with some commonality (e.g., traffic size, physical proximity, and common MCS requested to reduce padding when traffic of the same size is transmitted). STAs may be allowed to access the random access channel in the RaOP they are assigned to. Some RaOP may be left for random access of the STAs at the same time. For example, RaOP 1=STA group 1, RaOP 2=STA group 2, and RaOP n=all STAs.

Further, the trigger frames, such as Trigger-R frame 1304 and/or the MU-BA/trigger frames 1306, may indicate the resources dedicated to random access. In one example, all RUs in the CRA TxOP may be allocated for random access. In another example, only a subset of the RUs in the transmission bandwidth may be allowed for random access. This subset of resources may be constant over an entire CRA TxOP or may change over the course of the CRA TxOP.

STAs may perform random access in the random access resources/RaOPs that they are permitted to access. For example, as illustrated in FIG. 13, STAs may transmit frames during transmissions 1312, 1322, etc. in a CRA TxOP 1302. In the illustrated example, after Trigger-R frame 1304, STA1 transmits a random access frame 1314 on RU1, STA2 transmits a random access frame 1316 on RU2, STAs 3 and 4 transmit random access frames 1318 on RU3, which collide, and RU4 is empty (1320). As mentioned above, a block ACK 1306 may be sent to the STAs immediately after the transmission, and the inter-spaced trigger frames 1306 may add and/or remove random access RUs within the CRA TxOP 1302 by scheduling specific users on specific RUs on an as-needed basis.

FIG. 14 is a signal diagram 1400 of an example sequential random access procedure using cascading trigger frames where RaOPs occur immediately after each other with a delayed MU-Block ACK. The example illustrated in FIG. 14 is the same as the example illustrated in FIG. 13 except that, instead of the AP 1310 transmitting block ACKs immediately after each transmission, RaOPs occur immediately after each other in the CRA TxOP 1302 with a delayed MU-Block ACK 1360 being transmitted to acknowledge all transmissions sent during the CRA TxOP 1302 at the end of the sequential TxOP 1302. The delayed block ACK 1360 may be based on any of the block ACK embodiments described above, but additional information regarding the RaOP the data was transmitted on may need to be included in the delayed block ACK 1360.

Figure 15:
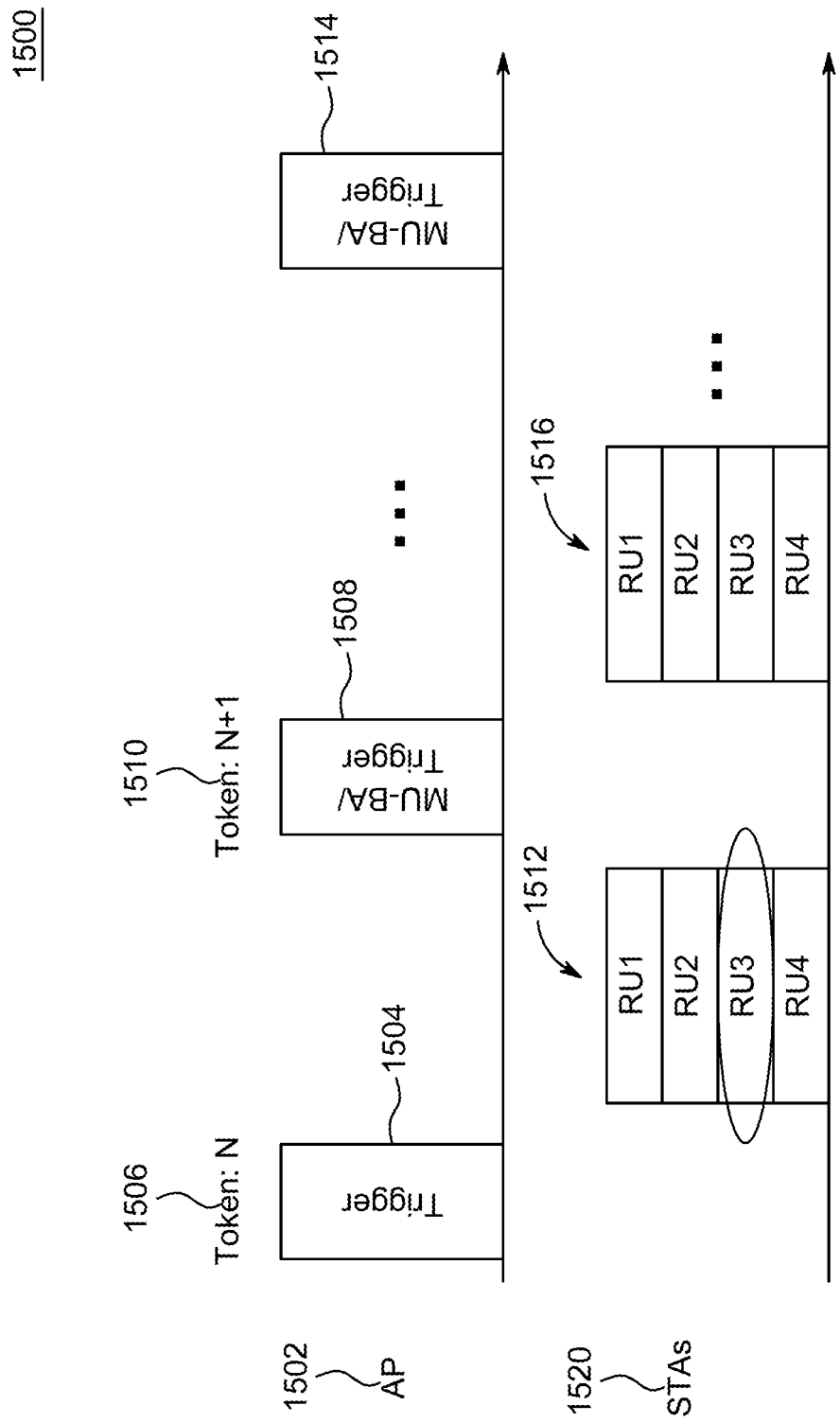
FIG. 15 is a signal diagram of an example PHY layer acknowledgement procedure when delayed ACK is permitted.

FIG. 15 is a signal diagram 1500 of an example PHY layer acknowledgement procedure when delayed ACK is permitted. In the example illustrated in FIG. 15, after acquiring the channel medium, the AP 1502 may transmit a trigger frame 1504, which may include a token or sequence number 1506. The token or sequence number may be increased in each subsequent trigger frame, as shown with respect to the token 1510 in the trigger frame 1508. On a condition that the token or sequence number reaches a maximum allowed threshold, token_max, the AP 1502 may reset the token/sequence to the initial value. Alternatively, the token/sequence may be included in other types of DL frames that may be followed by a UL MU frame.

The AP 1502 may receive random access or SRA frames 1512, 1516 in the UL MU frame a SIFS time after each trigger frame 1504, 1508. The AP 1502 may record the RU indices on which random access frames were successfully detected.

In one embodiment illustrated in FIG. 15, a SIFS time after the UL MU frame 1512, the AP may include a PHY layer acknowledgement in the DL transmission 1512, for example. This acknowledgement may be an immediate PHY ACK/BA for the previous UL MU transmission 1512, and the AP may use the RU index to explicitly indicate the transmission that it is acknowledging. In another embodiment illustrated in FIG. 15, some combination of delayed and immediate PHY ACK/BA may be used, or just delayed PHY ACK/BA may be used, to acknowledge the past several MU transmissions. Here, the AP 1502 may use the token included in the trigger frame and the RU index to explicitly indicate the transmission. If PHY ACK/BA is used, the AP 1502 may transmit the frame in a broadcast format (e.g., the SIG-B field may indicate that the frame may need to be decoded by all STAs 1520. The maximum allowed delayed time in units of DL/UL frame exchanges may be less than $\Sigma_{n=1}^{token\_max} T_n$, where $T_n$ may be a transmission duration of the nth trigger frame plus the following UL transmission. In embodiments, both PHY layer ACK and NACK may be signaled.

Figure 16:
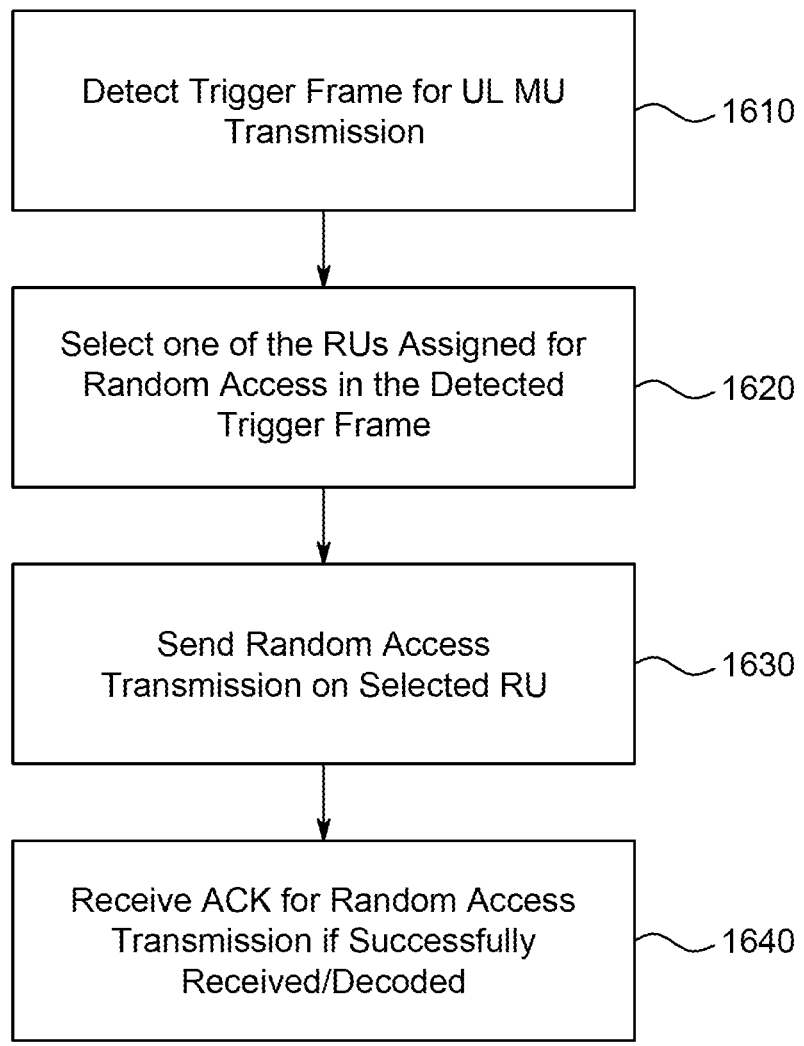
FIG. 16 is a flow diagram of an example method of UL MU random access.

FIG. 16 is a flow diagram 1600 of an example method of UL MU random access. The method may be implemented in a non-AP STA or other WTRU, for example, using some combination of a transmitter, receiver and one or more processors. In the example illustrated in FIG. 16, a trigger frame for UL MU transmission is detected (1610). In embodiments, the trigger frame may include an assignment of RUs for random access in upcoming UL MU PPDUs and an indication that the trigger frame is one of a plurality of trigger frames in a cascading sequence of trigger frames in an MU transmission opportunity (TxOP). One of the RUs in the assignment of RUs may be selected for a random access transmission (1620). A random access transmission may be sent on the selected RU (1630). An ACK for the random access transmission may be received on a condition that the transmission is successfully received and decoded (1640), for example, by an AP, base station or other WTRU. In embodiments, the ACK may be aggregated with one of the plurality of trigger frames in the sequence.

In embodiments, at least one trigger frame of the plurality of trigger frames in the sequence may include a last trigger indication. In embodiments, the last trigger indication may indicate, for example, that the at least one frame is the last trigger frame in a target wait time (TWT) service period (SP) that schedules UL power save polls (PS-polls). A sleep state may be entered in response to the indication in the at least one trigger frame. The trigger frame may include a field that polls for a traffic buffer status of the WTRU.

The assignment of RUs for random access in the upcoming UL OFDMA transmission may be for an integer number, M, of RUs, and the one of the RUs in the assignment of RUs for random access transmission may be selected by generating a random backoff index, R, from a range of integer values between zero and defined maximum value. On a condition that R>M, the random access transmission may be held, and the value of R may be reset to R=R−M. The reset value of R may be used to compete for the next MU random access opportunity in the TxOP. The non-AP STA or WTRU may transmit on an Rth RU of the RUs included in the assignment of RUs for random access on a condition that R≤M. The trigger frame may include a common information field that carries information to set a high efficiency (HE)-SIG-A field in the upcoming UL MU PPDU.

Figure 17:
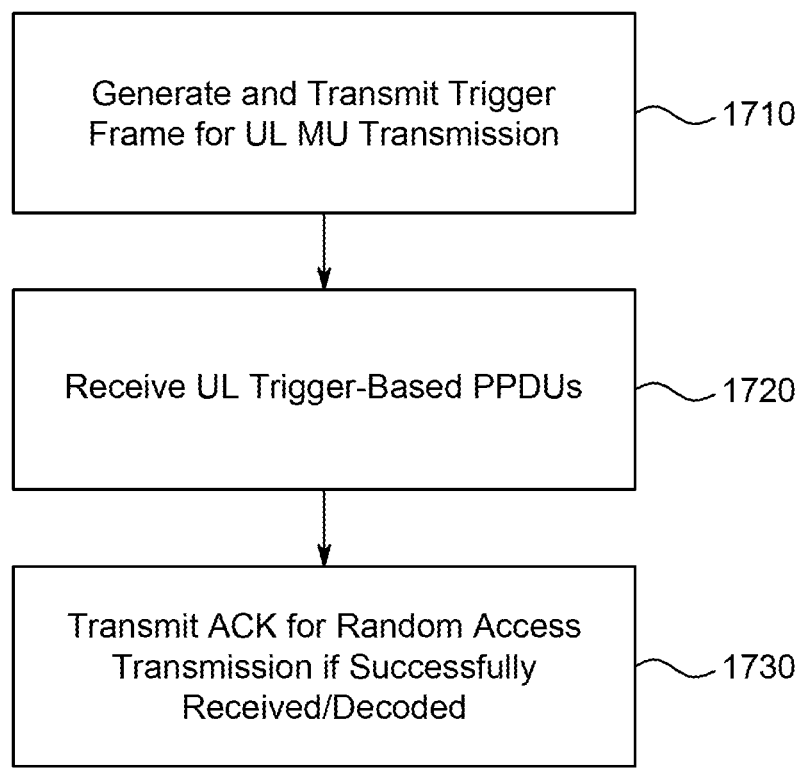
FIG. 17 is a flow diagram of another example method of UL MU random access.

FIG. 17 is a flow diagram 1700 of another example method of UL MU random access. The method may be implemented in an AP, base station or other WTRU, for example, using some combination of a transmitter, receiver and one or more processors. In the example illustrated in FIG. 17, a trigger frame for UL MU transmission may be generated and transmitted to a plurality of WTRUs or STAs (1710). In embodiments, the trigger frame may include an assignment of RUs for random access in upcoming UL trigger-based PPDUs and an indication that the trigger frame is one of a plurality of trigger frames in a cascading sequence of trigger frames in an MU TxOP. The UL trigger-based PPDUs may then be received (1720). In embodiments, the UL trigger-based PPDUs may include at least one frame from at least one of the plurality of WTRUs or STAs on one of the assigned RUs. An acknowledgement for the at least one frame may be transmitted (1730) on a condition that the at least one frame was successfully received and decoded. In embodiments, the ACK may be aggregated with one of the plurality of trigger frames in the sequence.

In embodiments, at least one of the plurality of trigger frames in the sequence may include a last trigger indication that may trigger WTRUs or STAs to enter a sleep state. In embodiments, the last trigger indication may be, for example, an indication that the trigger frame is the last trigger frame in a target wait time (TWT) service period (SP) that schedules UL power save polls (PS-polls). The trigger frame may include a field that polls for a traffic buffer status of WTRUs or STAs. In embodiments, the trigger frame may include a common information field that carries information to set an HE-SIG-A field in the UL MU PPDU.

Figure 18:
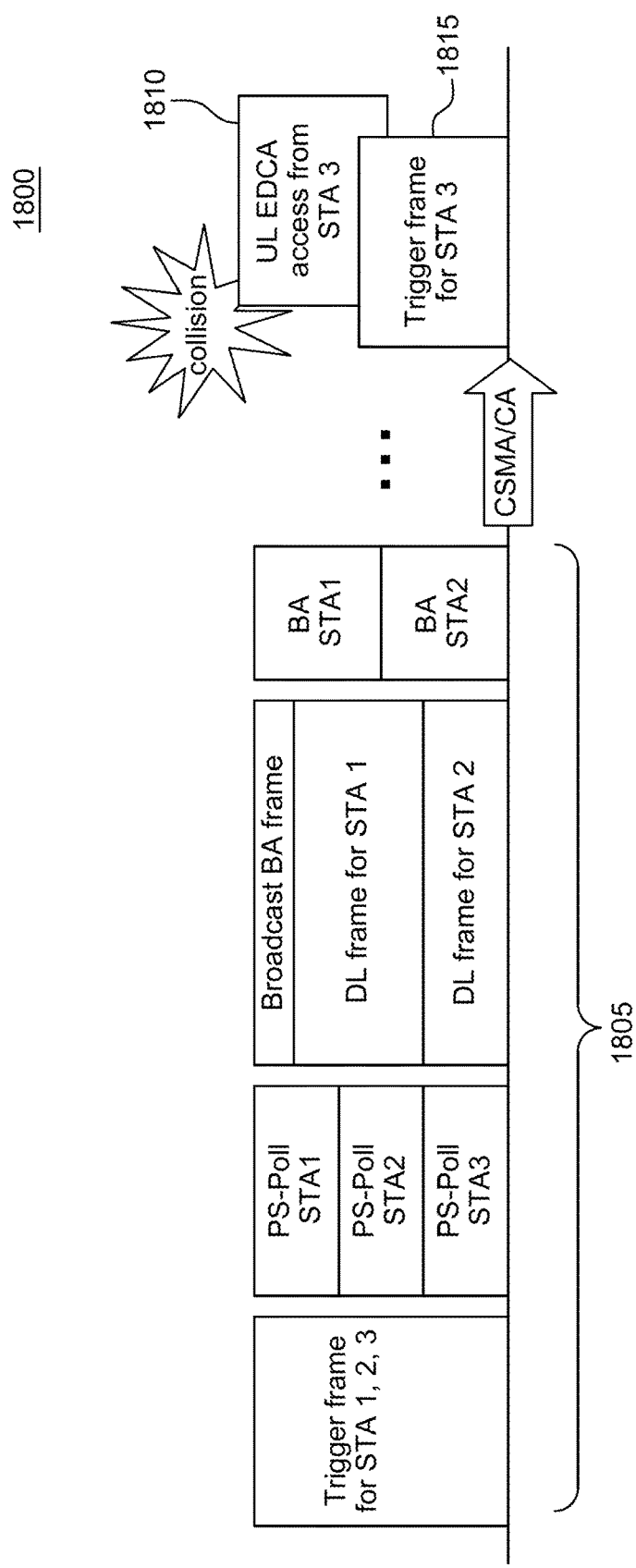
FIG. 18 is a diagram illustrating a potential collision that may occur a result of the STA returning to the normal EDCA procedure after a UL MU random access procedure or scheduled UL transmission of a short packet.

Once a non-AP STA or WTRU has made the AP aware of its need for UL access, and after any of the UL MU random access procedures described above, or after a scheduled UL transmission of a short packet (e.g., by providing buffer status information in a PS-Poll frame per AC), a STA may still access the medium via the normal EDCA procedure or via the random access trigger frame. FIG. 18 is a diagram 1800 illustrating a potential collision that may occur as a result of the STA returning to the normal EDCA procedure after a UL MU random access procedure or scheduled UL transmission of a short packet.

In the example illustrated in FIG. 18, the STAs may not know how long to wait for a trigger frame to arrive before falling back to the normal EDCA procedure. After the TxOP 1805 finishes, and STA 3 has not received its trigger frame, STA3 may fall back to the normal EDCA procedure to transmit its UL data 1810, which had previously been reported to the AP. This may increase the probability that the transmission 1810 collides with a trigger frame 1815 destined for STA3 using the UL MU random access procedure. It may also create the problem that STA3 may have nothing to send if a trigger frame destined to itself is received after a successful EDCA access.

In embodiments, a NAV or a prohibitive timer may be provided in the acknowledgement frame responding to the frame carrying the buffer status report from the STA. The NAV may be set per STA per access category (AC) and may not apply to STAs that the acknowledgement frame is not addressed to. After the NAV/prohibitive timer is started in the STA, and before expiry of the timer, the per AC EDCA backoff timer may be paused. Alternatively, a timer value may be provided in a broadcast message, such as a beacon frame or other frames providing system information, such as a probe response frame.

The prohibitive timer may be stopped when the STA receives a trigger frame addressed to itself. The timer may be paused when the TxOP holder is the AP or whenever the medium is busy. When the timer expires, the EDCA procedure may be resumed to reduce the possibility of collision when multiple STAs use the same timer value.

In embodiments, the STA may disregard the timer and resume EDCA access if traffic of a higher priority AC has arrived that has not been previously reported to the AP. Further, the STA may disregard the timer if a certain portion of a DL preamble, such as HE-SIG-B, could not be decoded.

When responding to the DL traffic, an updated buffer status may be reported together with the acknowledgement, and the prohibitive timer may be restarted. For the same class of traffic, different values of the timer may apply depending on whether the frame carrying the buffer status is acknowledged (such as data) or not (such as an acknowledgement). The pause of EDCA access may not apply after sending a buffer status report, for example, if there is an on-going transmission attempt due to a previously failed EDCA access. The STA may perform a negotiation of timer values when it associates with the AP.

With UL MU random access, depending on the random access protocol, it may be possible that some RUs may not be occupied by any STAs, as is described for some of the embodiments above. In this scenario, it may need to be determined how to transmit the preamble, especially on the empty RU. Further, the preamble may be designed to enable an accurate start of packet detection, which may include AGC and time/frequency synchronization, accurate channel estimation for UL MU PPDU, backward compatibility, and unified format for both DL/UL SU/MU transmissions.

In embodiments, such as illustrated in FIG. 7, all STAs may transmit the L-STF, L-LTF, L-SIG, and HE-SIG fields over the entire band. The AP may assign the information to be carried in the L-SIG and HE-SIG fields in its DL trigger frame. The HE-STF, HE-LTF and HE data fields may be transmitted over the allocated RUs.

Figure 19:
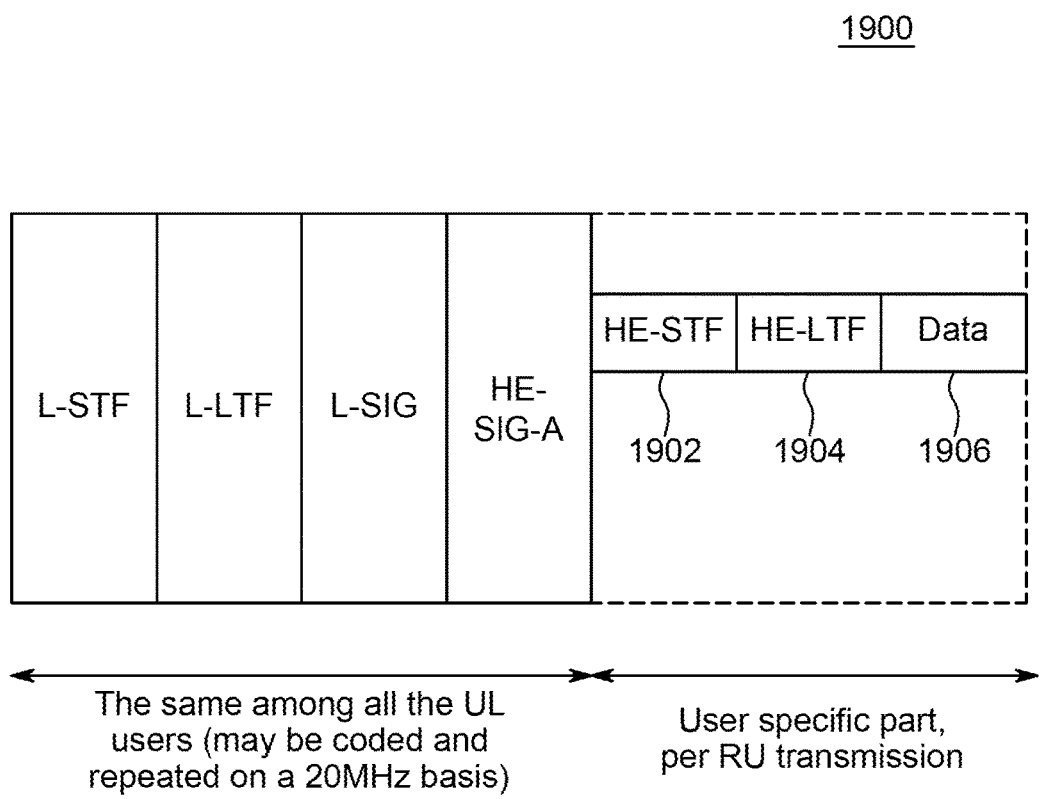
FIG. 19 is a diagram of an example UL MU PPDU.

FIG. 19 is a diagram of an example UL MU PPDU 1900. In the example illustrated in FIG. 19, the HE-STF 1902, HE-LTF 1904 and data 1906 fields may be transmitted on the RUs assigned to the user. Alternatively, the HE-STF 1902 and HE-LTF 1904 fields may be transmitted on one or more 20 MHz basic channels on which the data transmission may occur. For example, if the AP assigns RUx and RUy to the STA, RUx may be on the first 20 MHz basic channel and RUy on the second 20 MHz channel (assuming the AP may operate on a channel with a bandwidth equal to or greater than 40 MHz).

In OFDMA, frequency resources presented in the form of sub-channels may be assigned to different radio links, which may all be in either uplink or downlink directions. When a signal is transmitted over a sub-channel allocated on one side of the channel relative to the central frequency, it may create interference on the other side of the channel as the image of the original signal, which may be due to RF I/Q amplitude and phase imbalances.

Figure 20:
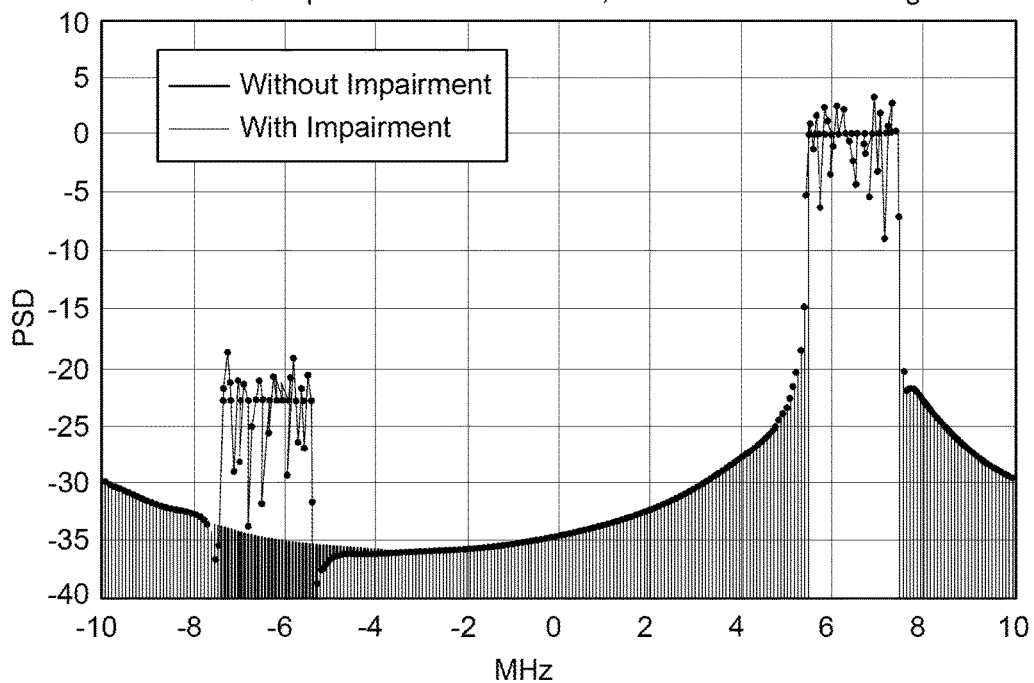
FIG. 20 is a graph of the power spectrum density of a partially loaded OFDM signal with radio frequency (RF) in-phase/quadrature (I/Q) imbalance.

FIG. 20 is a graph 2000 of the power spectrum density of a partially loaded OFDM signal with RF I/Q imbalance. The graph 2000 in FIG. 20 shows a snapshot of a scenario in which, among 256 subcarriers in a 20 MHz channel, a sub-channel with subcarriers from 199 to 224 (shown as A sub-channel in the graph) is loaded with data. Due to RF I/Q imbalance, about 23 dB interference is generated in the image of the sub-channel with subcarriers from −119 to −224 (shown as B sub-channel in the figure).

In single BSS scenarios, in the OFDMA DL, this interference may not be significant since the transmit powers on all sub-channels are the same as are the receive (Rx) powers on these sub-channels at each STA. However, in the OFDMA UL, if there is no power control or the power control is not accurate, the interference at the image sub-channel (e.g., B in FIG. 20) could be significant (e.g., the STA using sub-channel B is farther away from the AP than the STA using channel A). With MU random access, the STAs may not be able to accurately control the transmit power such that received powers at the AP side are aligned. Thus, the interference may be more severe for MU random access.

Figure 21:
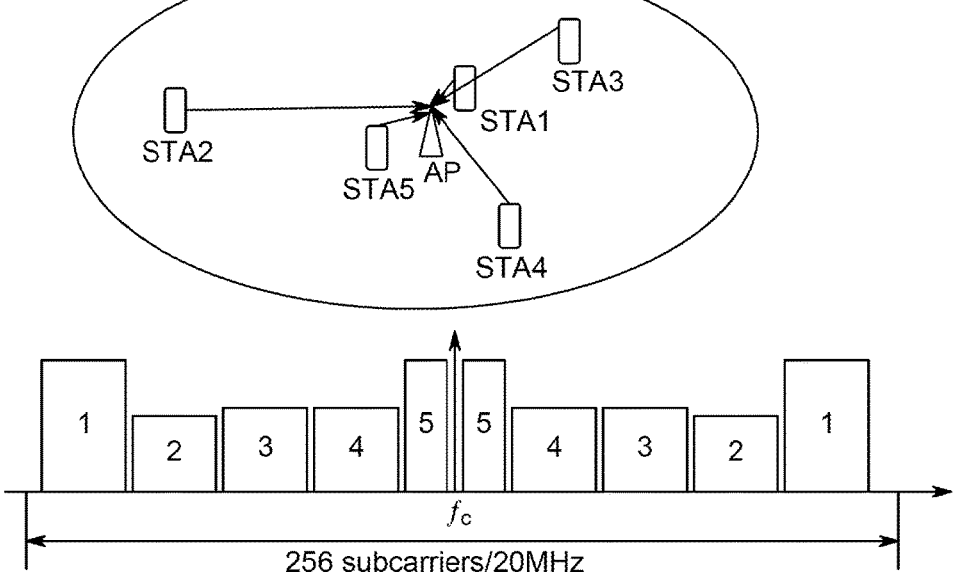
FIG. 21 is a diagram showing an example of symmetric random access.

Accordingly, in embodiments, the trigger frame that allocates RUs for random access may be designed such that symmetric random access may be used. This means that the STAs may use the RUs that are symmetrically allocated around the center frequency, as shown in the diagram 2100 of FIG. 21.

In scenarios where different STAs have different traffic priorities, the OFDMA random access procedure may be modified to take into account the traffic priorities of the different STAs. This may allow STAs with the correct priorities to access the medium.

In embodiments, when a STA has a frame to send, it may initialize an internal OFDMA backoff (OBO) to a random value in the range of zero to OFDMA contention window (CWO). For a STA with a non-zero OBO value, it may decrement its OBO by 1 in every RU assigned to a particular AID value with the TF-R. For a STA, its OBO decrements by the value, unless OBO=0, equal to the number of RUs assigned to the particular AID value in a TF-R. OBO for any STA can only be zero once every TF-R. A STA with OBO decremented to zero may randomly select any one of the assigned RUs for random access and transmit in its frame.

Figure 22:
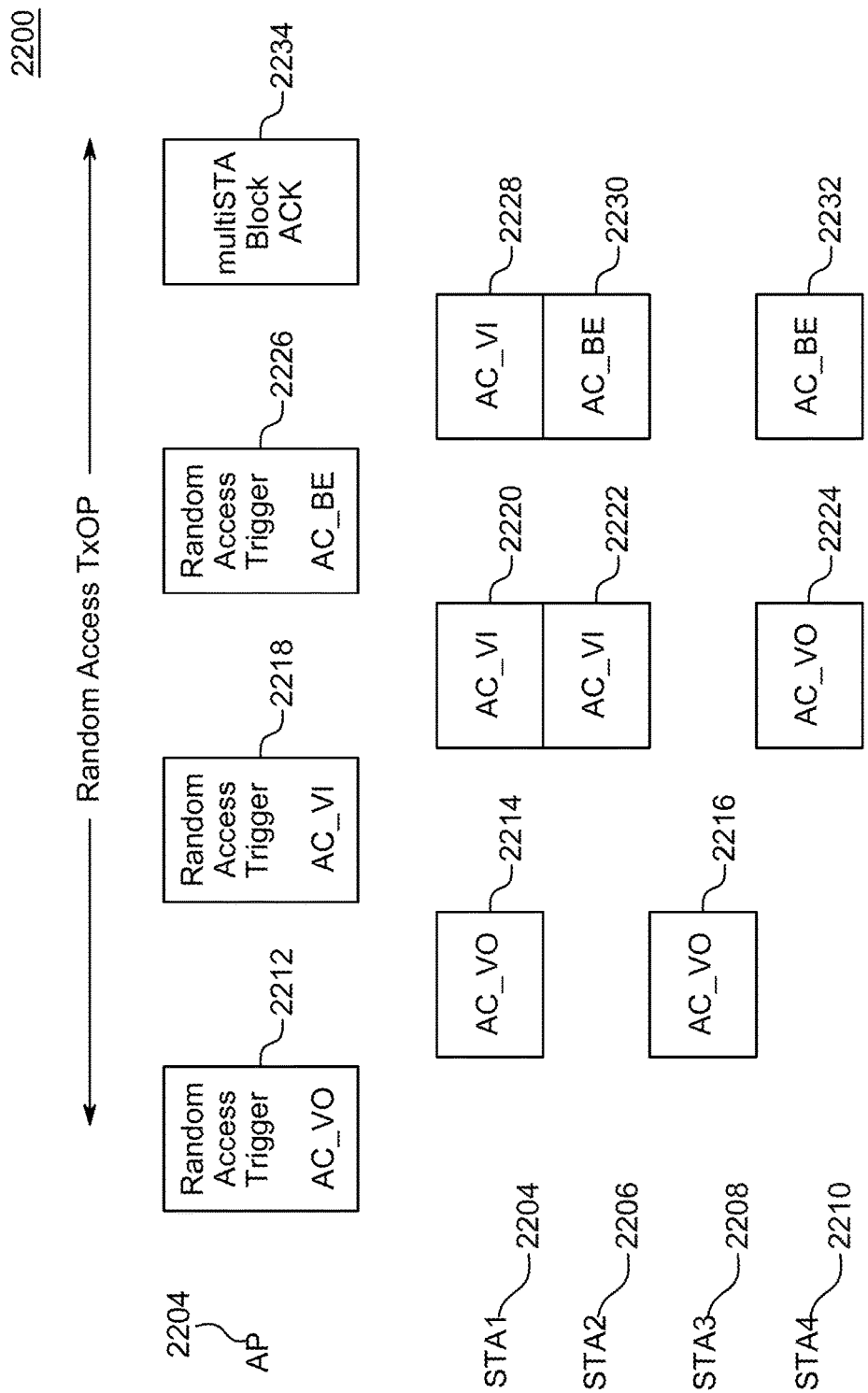
FIG. 22 is a signal diagram of an example random access continuous transmission opportunity (TxOP) with traffic priorities determined within each random access opportunity.
Figure 23:
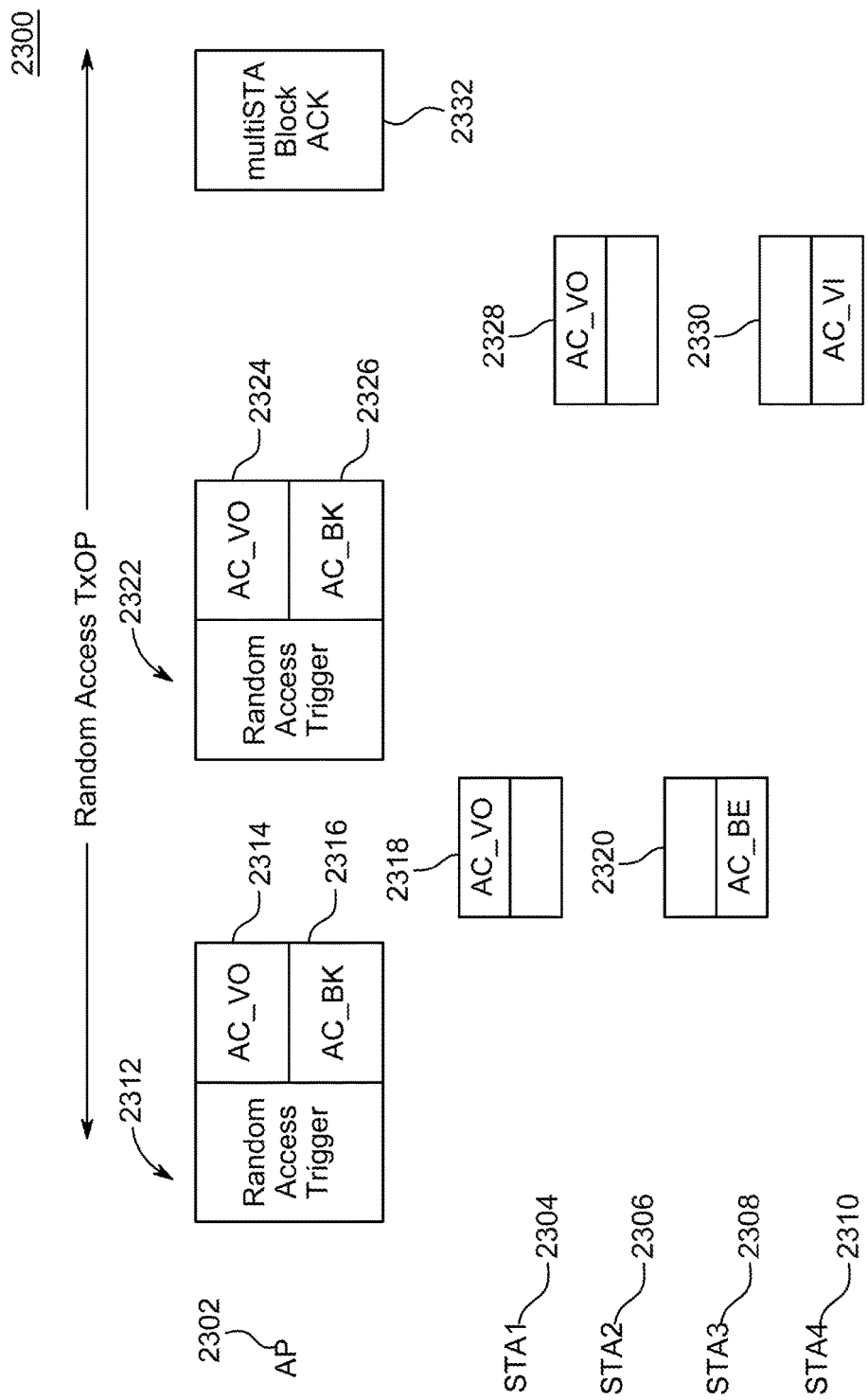
FIG. 23 is a signal diagram of an example random access continuous TxOP with traffic priorities determined for specific RUs.

In embodiments, the OFDMA back-off contention window (CWO) may be initialized to a value based on the traffic type. These may be defined as: Voice: OBO_backoff [AC_VO]; Video: OBO_backoff [AC_VI]; Best effort: OBO_backoff[AC_BE]; and Background: OBO_backoff [AC_BK], where Voice<Video<best effort<background. This may give different priorities to the different traffic types. In other embodiments, specific random access transmit opportunities or random access OFDMA resources may be reserved for specific traffic access categories, and only STAs with traffic in that access category or higher may be permitted to access the medium during that specific random access opportunity. And in other embodiments, specific random access OFDMA resources may be reserved for specific traffic access categories, and only STAs with traffic in that access category or higher may be permitted to access the medium during that specific random access opportunity. FIGS. 22 and 23 below are diagrams showing the different TxOPs with traffic priorities being determined within each random access opportunity and with traffic priorities being determined for specific RUs, respectively.

For both cases, the following procedure may be used. The AP may send out a random access trigger to the STAs. The preamble of the random access trigger may signal the resources available and the traffic access categories allowed. The HE-SIG-B field of the preamble may be used to signal the information to the STAs, as described above. The common section of the SIG-B frame may indicate the resources that are available for transmission. This may include the bandwidth of each random access RU as well as its availability (and in some cases, the AP may desire to silence or reserve a specific RU).

In one example, the HE-SIG-B field may indicate an allocation of fixed bandwidth RUs only or a mix of different sized RUs. The user specific section of the HE-SIG-B field may indicate the STAs, groups of STAs and traffic priorities of the STAs allowed to compete for the corresponding resource or RU. In this case, it may become an RU-specific signaling field.

On a condition that there are no restrictions, a flag may be placed in the common HE-SIG-B field to indicate that all STAs may access the resources. In this case, the HE-SIG-B field may be empty. Alternatively, the user specific HE-SIG-B field may be set to a value that indicates that all STAs may compete for the resource, for example, the BSSID of the BSS. Alternatively, if a group address is not assigned to a resource, it may be inferred that all STAs may access the resource. If a traffic class is not assigned to a resource, it may be inferred that all traffic classes may access the resource. In a multiple BSSID scenario with virtual BSSs, the AP may use the common BSSID for the physical AP to ensure that all STAs in all BSSs are allowed to compete for the resources.

On a condition that there are restrictions on which STAs are allowed to compete for the random access resource, a group-ID may be used in place of the STAID or user specific ID to indicate the group of STAs allowed to compete for the resource. STAs may be grouped based on different criterion, such as traffic types, physical location (to minimize hidden nodes), and OBSS interactions (to minimize interference to/from OBSS STAs). The AP may add a STA to a group by sending a group adding frame with the address of the STA and the address of the group it belongs to. The AP may also remove a STA from a group in the same manner. The STA may send an ACK to indicate that it has been added to the group. Groups may not be mutually exclusive (i.e., a STA may belong to multiple groups).

On a condition that there are restrictions on the access categories of the traffic of the STAs allowed to compete for a resource, the specific traffic access category (AC) (or minimum traffic class allowed) may be sent in the HE-SIG-B field for that specific resource. In the event that all resources are traffic class restricted, the minimum AC may be sent in the common HE-SIG-B field. In another embodiment, all ACs that are permitted may be enumerated. Table 1 below shows a possible SIG-B structure for traffic and group restrictions.

TABLE 1

| SIG-B Structure | | |
|---|---|---|
| Common | [RU1 RU2 RU3 RU4 RU5 RU6 RU7 RU8 RU9] | 26 tone RU allocation |
| User specific/RU specific | | |
| | RU1: Grp 1, AC_VO | Allows group 1 with at least voice traffic |

TABLE 1-continued

| SIG-B Structure | |
|---|---|
| RU2: Grp 2, AC_BE | Allows Group 2 with at least best effort traffic (i.e. all traffic) |
| RU3: AC_VI | All users, at least video traffic |
| RU3: AC_BE | All users, all traffic |
| RU3: AC_BE | All users, all traffic |
| RU3: AC_BE | All users, all traffic |
| RU3: AC_BE | All users, all traffic |
| RU3: AC_BE | All users, all traffic |
| RU3: AC_BE | All users, all traffic |

FIG. 22 is a signal diagram 2200 of an example random access continuous TxOP with traffic priorities determined within each random access opportunity. In the example illustrated in FIG. 22, the AP 2202 transmits a first random access trigger 2212 that specifies a minimum of AC_VO. In response to the trigger 2212, STA1 2204 and STA 3 2206 transmit AC-VO frames of 2214 and 2216, respectively. The AP 2202 transmits a second random access trigger 2218 that specifies a minimum of AC_VI. In response to the trigger, STA 1 2204 and STA2 2206 transmit AC_VI frames 2220 and 2222, respectively, and STA4 2208 transmits an AC_VO frame 2224. The AP 2202 transmits a third random access trigger 2226 that specifies a minimum of AC_BE. In response to the trigger 2226, STA1 2204 transmits an AC_VI frame 2228, and STA2 2208 and STA4 2210 transmit AC_BE frames 2230 and 2232, respectively. The AP 2202 may then send a multi-STA block ACK 2234 for all of the transmissions in the continuous random access TxOP.

FIG. 23 is a signal diagram 2300 of an example random access continuous TxOP with traffic priorities determined for specific RUs. In the example illustrated in FIG. 23, an AP 2302 transmits a first random access trigger 2312 specifying a minimum of AC_VO on RU1 2314 and a minimum of AC_BK on RU2 2316. In response to the first random access trigger 2312, STA1 2304 acquires RU1 and transmits an AC_VO frame 2318 on RU1, and STA3 2308 acquires RU2 and transmits an AC_BE frame 2320 on RU2. The AP 2302 transmits a second random access trigger 2322 specifying a minimum of AC_VO on RU1 and a minimum of AC_BK on RU2. In response to the second trigger frame 2322, STA2 2306 acquires RU1 and transmits an AC_VO frame 2328, and STA4 2310 acquires RU2 and transmits an AC_VI frame 2330. The AP 2302 may then send a multi-STA block ACK 2332.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
a receiver and a processor, the receiver and the processor being configured to detect a trigger frame for uplink (UL) multi-user (MU) transmission, the trigger frame including an assignment of resource units (RUs) for random access in upcoming UL MU physical layer protocol data units (PPDUs) and an indication that the trigger frame is one of a plurality of trigger frames in a cascading sequence of trigger frames in an MU transmission opportunity (TxOP); and
a transmitter, the processor and transmitter being configured to select one of the RUs in the assignment of RUs for a random access transmission and send the random access transmission on the selected one of the RUs.

2. The WTRU of claim 1, wherein the receiver is further configured to receive an acknowledgement for the random access transmission, the acknowledgement being aggregated with one of the plurality of trigger frames in the sequence.

3. The WTRU of claim 1, wherein the processor is further configured to enter a sleep state in response to a last trigger indication in at least one trigger frame of the plurality of trigger frames in the sequence.

4. The WTRU of claim 1, wherein the trigger frame includes a field that polls for a traffic buffer status of the WTRU.

5. The WTRU of claim 1, wherein the assignment of RUs for random access in the upcoming UL OFDMA transmission is for an integer number, M, of RUs, and the processor and the transmitter are configured to select the one of the RUs in the assignment of RUs for the random access transmission by:
generating a random backoff index, R, from a range of integer values between zero and a defined maximum value,
on a condition that R>M, holding the random access transmission and re-setting the value of R to R=R−M, and
using the re-set value of R to compete for the next MU random access opportunity in the TxOP.

6. The WTRU of claim 5, wherein the processor and the transmitter are further configured to select the one of the RUs in the assignment of RUs for the random transmission by transmitting on an Rth RU of the RUs included in the assignment of RUs for random access on a condition that R≤M.

7. The WTRU of claim 1, wherein the trigger frame includes a common information field that carries information to set a high efficiency (HE)-SIG-A field in the upcoming UL MU PPDU.

8. A method, implemented in a wireless transmit/receive unit (WTRU), the method comprising:
detecting a trigger frame for uplink (UL) multi-user (MU) transmission, the trigger frame including an assignment of resource units (RUs) for random access in upcoming UL MU physical layer protocol data units (PPDUs) and an indication that the trigger frame is one of a plurality of trigger frames in a cascading sequence of trigger frames in an MU transmission opportunity (TxOP);
selecting one of the RUs in the assignment of RUs for a random access transmission; and
sending the random access transmission on the selected one of the RUs.

9. The method of claim 8, further comprising receiving an acknowledgement for the random access transmission, the acknowledgement being aggregated with one of the plurality of trigger frames in the sequence.

10. The method of claim 8, further comprising entering a sleep state in response to a last trigger indication in at least one trigger frame of the plurality of trigger frames in the sequence.

11. The method of claim 8, wherein the trigger frame includes a field that polls for a traffic buffer status of the WTRU.

12. The method of claim 8, wherein the assignment of RUs for random access in the upcoming UL OFDMA transmission is for an integer number, M, of RUs, and the selecting one of the RUs in the assignment of RUs for a random access transmission comprises:
generating a random backoff index, R, from a range of integer values between zero and a defined maximum value,
on a condition that R>M, holding the random access transmission and re-setting the value of R to R=R−M, and
using the re-set value of R to compete for the next MU random access opportunity in the TxOP.

13. The method of claim 12, further comprising transmitting on an Rth RU of the RUs included in the assignment of RUs for random access on a condition that R≤M.

14. The method of claim 8, wherein the trigger frame includes a common information field that carries information to set a high efficiency (HE)-SIG-A field in the upcoming UL MU PPDU.

15. An access point (AP) comprising:
a processor and a transmitter, the processor and the transmitter being configured to generate and transmit a trigger frame for uplink (UL) multi-user (MU) transmission to a plurality of stations (STAs), the trigger frame including an assignment of resource units (RUs) for random access in upcoming UL trigger-based physical layer protocol data units (PPDUs) and an indication that the trigger frame is one of a plurality of trigger frames in a cascading sequence of trigger frames in an MU transmission opportunity (TxOP); and
a receiver, the receiver and the processor being configured to receive the UL trigger-based PPDUs, the received trigger-based PPDUs including at least one frame from at least one of the plurality of STAs on one of the assigned RUs,
wherein the transmitter and the processor are further configured to transmit an acknowledgement for the at least one frame, the acknowledgement being aggregated with one of the plurality of trigger frames in the sequence.

16. The AP of claim 15, wherein at least one frame of the plurality of trigger frames in the sequence includes a last trigger indication that triggers STAs to enter a sleep state.

17. The AP of claim 15, wherein the trigger frame includes a field that polls for a traffic buffer status of STAs.

18. The AP of claim 15, wherein the trigger frame includes a common information field that carries information to set a high efficiency (HE)-SIG-A field in the UL MU PPDU.

* * * * *